(12) United States Patent
Gravante et al.

(10) Patent No.: US 11,051,001 B2
(45) Date of Patent: *Jun. 29, 2021

(54) METHOD AND SYSTEM FOR GENERATING A TWO-DIMENSIONAL AND A THREE-DIMENSIONAL IMAGE STREAM

(71) Applicant: Avigilon Corporation, Vancouver (CA)

(72) Inventors: Barry Gravante, Lynnfield, MA (US); Pietro Russo, Melrose, MA (US); Mahesh Saptharishi, Boston, MA (US)

(73) Assignee: AVIGILON CORPORATION, Vancouver (CA)

( * ) Notice: Subject to any disclaimer, the term of this patent is extended or adjusted under 35 U.S.C. 154(b) by 56 days.

This patent is subject to a terminal disclaimer.

(21) Appl. No.: 16/425,764

(22) Filed: May 29, 2019

(65) Prior Publication Data

US 2020/0380708 A1    Dec. 3, 2020

(51) Int. Cl.
| | |
|---|---|
| *G06T 7/521* | (2017.01) |
| *H04N 13/286* | (2018.01) |
| *H04N 13/254* | (2018.01) |
| *H04N 13/296* | (2018.01) |
| *H04N 13/239* | (2018.01) |
| *H04N 13/156* | (2018.01) |
| *H04N 13/275* | (2018.01) |
| *G06T 7/20* | (2017.01) |

(52) U.S. Cl.
CPC ............. *H04N 13/286* (2018.05); *G06T 7/20* (2013.01); *G06T 7/521* (2017.01); *H04N 13/156* (2018.05); *H04N 13/239* (2018.05); *H04N 13/254* (2018.05); *H04N 13/275* (2018.05); *H04N 13/296* (2018.05)

(58) Field of Classification Search
CPC ......... G06T 7/521; G06T 7/20; G06T 15/205; G06T 2200/04; G06T 2207/20228; G06T 7/536; H04N 13/156; H04N 13/275; G01B 11/2513; G01B 11/25; G06K 9/2036; G06K 9/209; G01C 11/025
See application file for complete search history.

(56) References Cited

U.S. PATENT DOCUMENTS

| | | | |
|---|---|---|---|
| 6,377,700 B1 | 4/2002 | Mack et al. | |
| 6,522,777 B1 * | 2/2003 | Paulsen .............. | G01B 11/2513 356/237.2 |

(Continued)

*Primary Examiner* — Ian L Lemieux
(74) *Attorney, Agent, or Firm* — Perry + Currier, Inc.

(57) ABSTRACT

Methods, systems, and techniques for generating two-dimensional (2D) and three-dimensional (3D) images and image streams. The images and image streams may be generated using active stereo cameras projecting at least one illumination pattern, or by using a structured light camera and a pair of different illumination patterns of which at least one is a structured light illumination pattern. When using an active stereo camera, a 3D image may be generated by performing a stereoscopic combination of a first set of images (depicting a first illumination pattern) and a 2D image may be generated using a second set of images (optionally depicting a second illumination pattern). When using a structured light camera, a 3D image may be generated based on a first image that depicts a structured light illumination pattern, and a 2D image may be generated from the first image and a second image that depicts a different illumination pattern.

36 Claims, 15 Drawing Sheets

(56) References Cited

U.S. PATENT DOCUMENTS

| | | | |
|---|---|---|---|
| 8,090,194 B2* | 1/2012 | Golrdon | G06K 9/209 382/154 |
| 8,224,064 B1 | 7/2012 | Hassebrook et al. | |
| 8,717,416 B2* | 5/2014 | Russell | H04N 13/254 348/46 |
| 8,836,948 B2 | 9/2014 | Liu | |
| 9,314,150 B2* | 4/2016 | Chen | G03B 15/14 |
| 9,392,259 B2 | 7/2016 | Borowski | |
| 9,872,010 B2* | 1/2018 | Tran | H04N 13/254 |
| 10,140,753 B2* | 11/2018 | Gordon | G01C 11/025 |
| 2004/0105580 A1 | 6/2004 | Hager et al. | |
| 2005/0238208 A1 | 10/2005 | Sim | |
| 2008/0106746 A1* | 5/2008 | Shpunt | G01B 11/2513 356/610 |
| 2008/0118143 A1* | 5/2008 | Gordon | G06T 7/521 382/154 |
| 2010/0265316 A1 | 10/2010 | Sali et al. | |
| 2011/0002020 A1* | 1/2011 | Khan | G03H 1/30 359/22 |
| 2011/0050859 A1* | 3/2011 | Kimmel | G01B 11/2509 348/50 |
| 2012/0176380 A1 | 7/2012 | Wang et al. | |
| 2012/0176478 A1* | 7/2012 | Wang | G01B 11/2527 348/47 |
| 2013/0335535 A1 | 12/2013 | Kane et al. | |
| 2014/0056510 A1* | 2/2014 | Van Bree | G06K 9/00228 382/154 |
| 2014/0071243 A1* | 3/2014 | Nakatsukasa | G01B 11/24 348/46 |
| 2014/0132734 A1* | 5/2014 | Zhuang | H04N 13/239 348/47 |
| 2014/0241614 A1* | 8/2014 | Lee | H04N 13/254 382/154 |
| 2020/0334895 A1* | 10/2020 | Skotheim | G06T 5/50 |

* cited by examiner

METHOD AND SYSTEM FOR GENERATING A TWO-DIMENSIONAL AND A THREE-DIMENSIONAL IMAGE STREAM

TECHNICAL FIELD

The present disclosure is directed at methods, systems, and techniques for generating a two-dimensional and a three-dimensional image stream.

BACKGROUND

In certain situations, having access to two-dimensional and three-dimensional versions of an image stream may be beneficial. A three-dimensional version of an image stream may be generated using passive stereo vision or active stereo vision, and active stereo vision can permit, relative to passive stereo vision, better performance in low light conditions or when imaging a textured surface. However, active stereo vision also requires more hardware than passive stereo vision, typically rendering a system that can capture a three-dimensional image stream using active stereo vision more technically complex and expensive than a system that is only capable of passive stereo vision.

SUMMARY

According to a first aspect, there is provided a method comprising: projecting a first illumination pattern on to a surface; capturing, using a plurality of image sensors, a first set of images of the surface when the first illumination pattern is projected on to the surface; ceasing to project the first illumination pattern on to the surface; capturing, using the plurality of image sensors, a second set of images of the surface when the first illumination pattern is absent from the surface; and generating: a three-dimensional (3D) image by performing a stereoscopic combination using the first set of images; and a two-dimensional (2D) image using the second set of images.

The 2D image may be one of the second set of images.

The method may be repeatedly performed to generate a 2D image stream and a 3D image stream.

An integration time for each image of the 2D image stream may be longer than an integration time for each image of the 3D image stream.

A rate at which the second set of images is captured may be higher than a rate at which the first set of images is captured.

The method may further comprise determining an amount of motion in at least one of the 2D and 3D image streams; and when the amount of motion equals or exceeds a framerate increase threshold, increasing a rate at which at least one of the first and second sets of images is captured.

The method may further comprise determining whether at least one of 2D and 3D image streams satisfies an illumination pattern change threshold; and when the illumination pattern change threshold is satisfied, replacing the first illumination pattern with a second illumination pattern that differs from the first illumination pattern, wherein at least a subsequent one of the first set of images comprises the second illumination pattern.

Determining when the illumination pattern change threshold is satisfied may comprise: determining an amount of motion in at least one of the 2D and 3D image streams; and determining that the illumination pattern threshold is satisfied when the amount of motion in the at least one of the 2D and 3D image streams equals or exceeds the illumination pattern change threshold.

Determining when the illumination pattern change threshold is satisfied may comprise: determining an amount of depth information present in the 3D image stream; and determining that the illumination pattern change threshold is satisfied when the amount of depth information equals or exceeds the illumination pattern change threshold.

Each of the first and second illumination patterns may comprise a field of dots, and the field of dots comprising the second illumination pattern may have a higher density than the field of dots comprising the first illumination pattern.

Projecting the first illumination pattern may comprise projecting light through a first mask, and projecting the second illumination pattern may comprise projecting light through a second mask.

Projecting the first illumination pattern may comprise projecting light through a first mask at a first angle, and projecting the second illumination pattern may comprise projecting light through the first mask at a second angle different from the first angle.

According to another aspect, there is provided a method comprising: projecting a first illumination pattern on to a surface; capturing, using a plurality of image sensors, a first set of images of the surface when the first illumination pattern is projected on to the surface; ceasing to project the first illumination pattern on to the surface; when the first illumination pattern is absent from the surface, projecting a second illumination pattern that differs from the first illumination pattern on to the surface; capturing, using the plurality of image sensors, a second set of images of the surface when the second illumination pattern is projected on to the surface; and generating: a three-dimensional (3D) image by performing a stereoscopic combination using the first set of images; and a two-dimensional (2D) image using the second set of images.

The first and second illumination patterns may be non-overlapping.

Projecting the first illumination pattern may comprise projecting light through a first mask, and projecting the second illumination pattern may comprise projecting light through a second mask.

Projecting the first illumination pattern may comprises projecting light through a first mask at a first angle, and projecting the second illumination pattern may comprise projecting light through the first mask at a second angle different from the first angle.

Generating the 2D image may comprise identifying pixels in a first image from the first set of images that represent the first illumination pattern; identifying pixels in a second image from the second set of images that correspond in surface location to the pixels identified in the first image, wherein the second illumination pattern is absent from the pixels identified in the second image; and filtering from the first image the first illumination pattern represented by the pixels identified in the first image using the pixels identified in the second image.

The method may further comprise ceasing to project the second illumination pattern on to the surface, and repeatedly performed to generate a 2D image stream and a 3D image stream.

An integration time for each image of the 2D image stream may be longer than an integration time for each image of the 3D image stream.

A rate at which the second set of images is captured may be higher than a rate at which the first set of images is captured.

The method may further comprise: determining an amount of motion in at least one of the 2D and 3D image streams; and when the amount of motion equals or exceeds a framerate increase threshold, increasing a rate at which at least one of the first and second sets of images is captured.

The method may further comprise: determining whether at least one of 2D and 3D image streams satisfies an illumination pattern change threshold; and when the illumination pattern change threshold is satisfied, replacing the first illumination pattern with a second illumination pattern that differs from the first illumination pattern, wherein at least a subsequent one of the first set of images comprises the second illumination pattern.

Determining when the illumination pattern change threshold is satisfied may comprise: determining an amount of motion in at least one of the 2D and 3D image streams; and determining that the illumination pattern threshold is satisfied when the amount of motion in the at least one of the 2D and 3D image streams equals or exceeds the illumination pattern change threshold.

Determining when the illumination pattern change threshold is satisfied may comprise: determining an amount of depth information present in the 3D image stream; and determining that the illumination pattern change threshold is satisfied when the amount of depth information equals or exceeds the illumination pattern change threshold.

Each of the first and second illumination patterns may comprise a field of dots, and the field of dots comprising the second illumination pattern may have a higher density than the field of dots comprising the first illumination pattern.

According to another aspect, there is provided a method comprising: projecting a first structured light illumination pattern on to a surface; capturing, using an image sensor, a first image of the surface when the first structured light illumination pattern is projected on to the surface; ceasing to project the first structured light illumination pattern on to the surface; when the first structured light illumination pattern is absent from the surface, projecting a second illumination pattern that differs from the first structured light illumination pattern on to the surface; capturing, using the image sensor, a second image of the surface when the second illumination pattern is projected on to the surface; and generating: a three-dimensional (3D) image using the first image; and a two-dimensional (2D) image using the first and second images.

The second illumination pattern may comprise a structured light illumination pattern.

The first structured light illumination pattern and the second illumination pattern may be non-overlapping.

Projecting the first structured light illumination pattern may comprise projecting light through a first mask, and projecting the second illumination pattern may comprise projecting light through a second mask.

Projecting the first structured light illumination pattern may comprise projecting light through a first mask at a first angle, and projecting the second illumination pattern may comprise projecting light through the first mask at a second angle different from the first angle.

Generating the 2D image may comprise: identifying pixels in a first image from the first set of images that represent the first structured light illumination pattern; identifying pixels in a second image from the second set of images that correspond in surface location to the pixels identified in the first image, wherein the second illumination pattern is absent from the pixels identified in the second image; and filtering from the first image the first structured light illumination pattern represented by the pixels identified in the first image using the pixels identified in the second image.

The method may further comprise ceasing to project the second illumination pattern on to the surface, and repeatedly performed to generate a 2D image stream and a 3D image stream.

An integration time for each image of the 2D image stream may be longer than an integration time for each image of the 3D image stream.

A rate at which the second set of images is captured may be higher than a rate at which the first set of images is captured.

The method may further comprise: determining an amount of motion in at least one of the 2D and 3D image streams; and when the amount of motion equals or exceeds a framerate increase threshold, increasing a rate at which at least one of the first and second sets of images is captured.

The method may further comprise: determining whether at least one of 2D and 3D image streams satisfies an illumination pattern change threshold; and when the illumination pattern change threshold is satisfied, replacing the first structured light illumination pattern with a second structured light illumination pattern that differs from the first structured light illumination pattern, wherein at least a subsequent one of the first set of images comprises the second structured light illumination pattern.

Determining when the illumination pattern change threshold is satisfied may comprise: determining an amount of motion in at least one of the 2D and 3D image streams; and determining that the illumination pattern threshold is satisfied when the amount of motion in the at least one of the 2D and 3D image streams equals or exceeds the illumination pattern change threshold.

Determining when the illumination pattern change threshold is satisfied may comprise: determining an amount of depth information present in the 3D image stream; and determining that the illumination pattern change threshold is satisfied when the amount of depth information equals or exceeds the illumination pattern change threshold.

Each of the first and second illumination patterns may comprises a field of dots, and the field of dots comprising the second illumination pattern may have a higher density than the field of dots comprising the first illumination pattern.

According to another aspect, there is provided a camera comprising: a first image sensor and a second image sensor that is located in a different position than the first image sensor; a first projector, comprising: a first light source; and a first mask positioned such that light from the first light source projects a first illumination pattern on to a surface; a processor communicatively coupled to the first image sensor, the second image sensor, and the first projector; and a memory device having stored thereon computer program code that is executable by the processor and that, when executed by the processor, causes the processor to perform a method comprising: projecting the first illumination pattern on to the surface; capturing, using the first and second image sensors, a first set of images of the surface when the first illumination pattern is projected on to the surface; ceasing to project the first illumination pattern on to the surface; capturing, using the first and second image sensors, a second set of images of the surface when the first illumination pattern is absent from the surface; and generating: a three-dimensional (3D) image by performing a stereoscopic combination using the first set of images; and a two-dimensional (2D) image using the second set of images.

The 2D image may be one of the second set of images.

The computer program code may cause the processor to repeatedly perform the method to generate a 2D image stream and a 3D image stream.

An integration time for each image of the 2D image stream may be longer than an integration time for each image of the 3D image stream.

A rate at which the second set of images is captured may be higher than a rate at which the first set of images is captured.

The method may further comprise: determining an amount of motion in at least one of the 2D and 3D image streams; and when the amount of motion equals or exceeds a framerate increase threshold, increasing a rate at which at least one of the 2D and 3D image streams is captured.

The method may further comprise: determining whether at least one of 2D and 3D image streams satisfies an illumination pattern change threshold; and when the illumination pattern change threshold is satisfied, replacing the first illumination pattern with a second illumination pattern that differs from the first illumination pattern, wherein at least a subsequent one of the first set of images comprises the second illumination pattern.

Determining when the illumination pattern change threshold is satisfied may comprise: determining an amount of motion in at least one of the 2D and 3D image streams; and determining that the illumination pattern threshold is satisfied when the amount of motion in the at least one of the 2D and 3D image streams equals or exceeds the illumination pattern change threshold.

Determining when the illumination pattern change threshold is satisfied may comprise: determining an amount of depth information present in the 3D image stream; and determining that the illumination pattern change threshold is satisfied when the amount of depth information equals or exceeds the illumination pattern change threshold.

Each of the first and second illumination patterns may comprise a field of dots, and the field of dots comprising the second illumination pattern may have a higher density than the field of dots comprising the first illumination pattern.

The camera may further comprise a second projector, comprising: a second light source; and a second mask positioned such that light from the second light source projects a second illumination pattern that differs from the first illumination pattern on to the surface. Projecting the first illumination pattern may comprise activating the first light source and deactivating the second light source, and projecting the second illumination pattern may comprise activating the second light source and deactivating the first light source.

The first projector may further comprises a second light source, the first and second light sources may be positioned such that light from the first and second light sources pass through the first mask at different angles, projecting the first illumination pattern may comprise activating the first light source and deactivating the second light source, and projecting the second illumination pattern may comprise activating the second light source and deactivating the first light source.

According to another aspect, there is provided a camera comprising: a first image sensor and a second image sensor that is located in a different position than the first image sensor; a projector system configured to project a first illumination pattern and a second illumination pattern that is different from the first illumination pattern on to a surface; a processor communicatively coupled to the first image sensor, the second image sensor, and the projector system; and a memory device having stored thereon computer program code that is executable by the processor and that, when executed by the processor, causes the processor to perform a method comprising: projecting the first illumination pattern on to the surface; capturing, using the first and second image sensors, a first set of images of the surface when the first illumination pattern is projected on to the surface; ceasing to project the first illumination pattern on to the surface; when the first illumination pattern is absent from the surface, projecting the second illumination pattern on to the surface; capturing, using the first and second image sensors, a second set of images of the surface when the second illumination pattern is projected on to the surface; and generating: a three-dimensional (3D) image by performing a stereoscopic combination using the first set of images; and a two-dimensional (2D) image using the second set of images.

The first and second illumination patterns may be non-overlapping.

The projection system may comprise: a first projector comprising: a first light source; and a first mask positioned such that light from the first light source projects the first illumination pattern; and a second projector comprising: a second light source; and a second mask positioned such that light from the second light source projects the second illumination pattern. Projecting the first illumination pattern may comprise activating the first light source and deactivating the second light source, and projecting the second illumination pattern may comprise activating the second light source and deactivating the first light source.

The projection system may comprise a first projector comprising: a first light source; a first mask; and a second light source, wherein the first and second light sources are positioned such that light from the first and second light sources pass through the first mask at different angles. Projecting the first illumination pattern may comprise activating the first light source and deactivating the second light source, and projecting the second illumination pattern may comprise activating the second light source and deactivating the first light source.

Generating the 2D image may comprise: identifying pixels in a first image from the first set of images that represent the first illumination pattern; identifying pixels in a second image from the second set of images that correspond in surface location to the pixels identified in the first image, wherein the second illumination pattern is absent from the pixels identified in the second image; and filtering from the first image the first illumination pattern represented by the pixels identified in the first image using the pixels identified in the second image.

The method may further comprise ceasing to project the second illumination pattern on to the surface, and the computer program code may cause the processor to repeatedly perform the method to generate a 2D image stream and a 3D image stream.

An integration time for each image of the 2D image stream may be longer than an integration time for each image of the 3D image stream.

A rate at which the second set of images is captured may be higher than a rate at which the first set of images is captured.

The method may further comprise: determining an amount of motion in at least one of the 2D and 3D image streams; and when the amount of motion equals or exceeds a framerate increase threshold, increasing a rate at which at least one of the 2D and 3D image streams is captured.

The method may further comprise: determining whether at least one of 2D and 3D image streams satisfies an illumination pattern change threshold; and when the illumination pattern change threshold is satisfied, replacing the first illumination pattern with a second illumination pattern that differs from the first illumination pattern, wherein at least a subsequent one of the first set of images comprises the second illumination pattern.

Determining when the illumination pattern change threshold is satisfied may comprise: determining an amount of motion in at least one of the 2D and 3D image streams; and determining that the illumination pattern threshold is satisfied when the amount of motion in the at least one of the 2D and 3D image streams equals or exceeds the illumination pattern change threshold.

Determining when the illumination pattern change threshold is satisfied may comprise: determining an amount of depth information present in the 3D image stream; and determining that the illumination pattern change threshold is satisfied when the amount of depth information equals or exceeds the illumination pattern change threshold.

Each of the first and second illumination patterns may comprise a field of dots, and wherein the field of dots comprising the second illumination pattern may have a higher density than the field of dots comprising the first illumination pattern.

According to another aspect, there is provided a camera comprising: an image sensor; a projector system configured to project a first structured light illumination pattern and a second illumination pattern that is different from the first structured light illumination pattern on to a surface; a processor communicatively coupled to the image sensor and the projector system; and a memory device having stored thereon computer program code that is executable by the processor and that, when executed by the processor, causes the processor to perform a method comprising: projecting the first structured light illumination pattern on to the surface; capturing, using the image sensor, a first image of the surface when the first structured light illumination pattern is projected on to the surface; ceasing to project the first structured light illumination pattern on to the surface; when the first structured light illumination pattern is absent from the surface, projecting the second illumination pattern on to the surface; capturing, using the image sensor, a second image of the surface when the second illumination pattern is projected on to the surface; and generating: a three-dimensional (3D) image using the first image; and a two-dimensional (2D) image using the first and second images.

The second illumination pattern may comprise a structured light illumination pattern.

The first structured light illumination pattern and the second illumination pattern may be non-overlapping.

The projection system may comprise: a first projector comprising: a first light source; and a first mask positioned such that light from the first light source projects the first structured light illumination pattern; and a second projector comprising: a second light source; and a second mask positioned such that light from the second light source projects the second illumination pattern. Projecting the first illumination pattern may comprise activating the first light source and deactivating the second light source, and projecting the second illumination pattern may comprise activating the second light source and deactivating the first light source.

The projection system may comprises a first projector comprising: a first light source; a first mask; and a second light source, wherein the first and second light sources are positioned such that light from the first and second light sources pass through the first mask at different angles. Projecting the first structured light illumination pattern may comprise activating the first light source and deactivating the second light source, and projecting the second illumination pattern may comprise activating the second light source and deactivating the first light source Generating the 2D image may comprise: identifying pixels in a first image from the first set of images that represent the first structured light illumination pattern; identifying pixels in a second image from the second set of images that correspond in surface location to the pixels identified in the first image, wherein the second illumination pattern is absent from the pixels identified in the second image; and filtering from the first image the first structured light illumination pattern represented by the pixels identified in the first image using the pixels identified in the second image.

The method may further comprise ceasing to project the second illumination pattern on to the surface, and the computer program code may cause the processor to repeatedly perform the method to generate a 2D image stream and a 3D image stream.

An integration time for each image of the 2D image stream may be longer than an integration time for each image of the 3D image stream.

A rate at which the second set of images is captured may be higher than a rate at which the first set of images is captured.

The method may further comprise: determining an amount of motion in at least one of the 2D and 3D image streams; and when the amount of motion equals or exceeds a framerate increase threshold, increasing a rate at which at least one of the 2D and 3D image streams is captured.

The method may further comprise: determining whether at least one of 2D and 3D image streams satisfies an illumination pattern change threshold; and when the illumination pattern change threshold is satisfied, replacing the first structured light illumination pattern with a second structured light illumination pattern that differs from the first structured light illumination pattern, wherein at least a subsequent one of the first set of images comprises the second structured light illumination pattern.

Determining when the illumination pattern change threshold is satisfied may comprise: determining an amount of motion in at least one of the 2D and 3D image streams; and determining that the illumination pattern threshold is satisfied when the amount of motion in the at least one of the 2D and 3D image streams equals or exceeds the illumination pattern change threshold.

Determining when the illumination pattern change threshold is satisfied may comprise: determining an amount of depth information present in the 3D image stream; and determining that the illumination pattern change threshold is satisfied when the amount of depth information equals or exceeds the illumination pattern change threshold.

Each of the first and second illumination patterns may comprise a field of dots, and the field of dots comprising the second illumination pattern may have a higher density than the field of dots comprising the first illumination pattern.

According to another aspect, there is provided a non-transitory computer readable medium having stored thereon computer program code that is executable by a processor and that, when executed by the processor, causes the processor to perform the method of any of the foregoing aspects or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

The detailed description refers to the following figures, in which.

Figure 1:
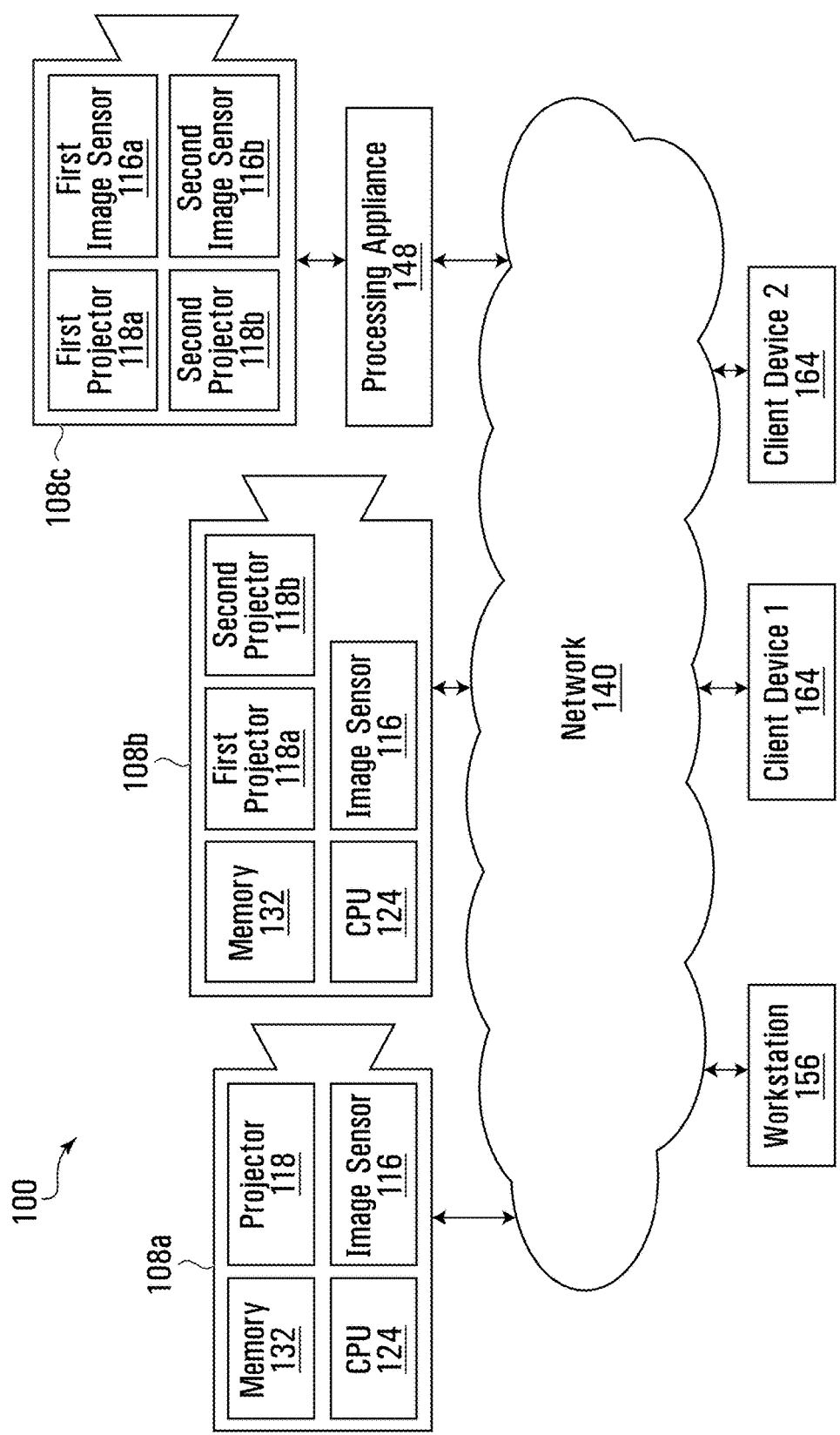
FIG. 1 illustrates a block diagram of connected devices of a video capture and playback system according to an example embodiment.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

Herein, an image stream may include a plurality of sequential image frames, which together form a video captured by the video capture device. "Video" and "image stream" are used interchangeably herein. Each image frame may be represented by a matrix of pixels, each pixel having a pixel image value. For example, the pixel image value may be a numerical value on grayscale (e.g., 0 to 255) or a plurality of numerical values for colored images. Examples of color spaces used to represent pixel image values in image data include RGB, YUV, CYKM, YCBCR 4:2:2, YCBCR 4:2:0 images.

"Metadata" or variants thereof herein refers to information obtained by computer-implemented analysis of images including images in video. For example, processing video may include, but is not limited to, image processing operations, analyzing, managing, compressing, encoding, storing, transmitting and/or playing back the video data. Analyzing the video may include segmenting areas of image frames and detecting visual objects, tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes three example embodiments of a camera 108 in the form of first through third cameras 108a-c. Each of the cameras 108a-c is operable to capture a plurality of images and produce image data representing the plurality of captured images. The camera 108 is an image capturing device and includes security video cameras.

Each of the cameras 108 includes at least one image sensor 116 for capturing a plurality of images. The camera 108 may be a digital video camera and the image sensor 116 may output captured light as a digital data. For example, the image sensor 116 may be a CMOS, NMOS, or CCD. In some embodiments, the camera 108 may be an analog camera connected to an encoder.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the camera 108 may be a multi-sensor camera that includes two or more sensors that are operable to capture light in different frequency ranges.

The at least one camera 108 may include a dedicated camera. It will be understood that a dedicated camera herein refers to a camera whose principal features is to capture images or video. In some example embodiments, the dedicated camera may perform functions associated to the captured images or video, such as but not limited to processing the image data produced by it or by another camera 108. For example, the dedicated camera may be a surveillance camera, such as any one of a pan-tilt-zoom camera, dome camera, in-ceiling camera, box camera, and bullet camera.

Additionally, or alternatively, the at least one camera 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each of the first and second cameras 108 includes one or more processors 124, one or more memory devices 132 coupled to the processors 124, and one or more network interfaces. The memory device can include a local memory (such as, for example, a random access memory and a cache memory) employed during execution of program instructions. The processor 124 executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) embedded processor, etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 116, and the network interface may be implemented within a SOC. Furthermore, when implemented in this way, a general purpose processor and one or more of a GPU and a DSP may be implemented together within the SOC.

Continuing with FIG. 1, each of the cameras 108 is connected to a network 140. Each camera 108 is operable to output image data representing images that it captures and transmit the image data over the network.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video capture and playback system 100 includes a processing appliance 148. For example, the third camera 108c in FIG. 1 is communicatively coupled to the processing appliance 148, which is operable to process the image data output by the third camera 108c. The processing appliance 148 also includes one or more processors and one or more memory devices coupled to the one or more processors. The processing appliance 148 may also include one or more network interfaces. For convenience of illustration, only one processing appliance 148 is shown; however it will be understood that the video capture and playback system 100 may include any suitable number of processing appliances 148. Furthermore, in at least some example embodiments (not depicted), the processing appliance 148 may be differently connected than as shown in FIG. 1. For example, one or more processing appliances 148 may be additionally or alternatively connected directly to one or both of the first and second cameras 108a,b; the processing appliance 148 may be directly connected to two or more of the cameras 108; and/or the processing appliance may be directly connected to the network 140 and not directly connected to any of the cameras 108.

For example, and as illustrated, the processing appliance 148 is connected to a camera 108 which may not have memory device 132 or CPU 124 to process image data. The processing appliance 148 may be further connected to the network 140.

As discussed further below, each of the cameras 108 of FIG. 1 is capable of generating and outputting two-dimensional (2D) and three-dimensional (3D) image streams. Each of the cameras 108a-c accordingly comprises at least one projector 118, which projects an illumination pattern on to a surface to aid in generating a 3D image stream. As used herein, a "3D image stream" means images in which depth data is encoded; for example, depth data may be encoded by color, as metadata, or in another suitable manner. The first camera 108a comprises a single projector 118 and a single image sensor 116, and may generate a 3D image stream using structured light, for example. The second camera 108b comprises a first projector 118a, a second projector 118b, and a single image sensor, and may also use structured light to generate a 3D image stream. The third camera 108c comprises a first projector 118a, a second projector 118b, a first image sensor 116a, and a second image sensor 116b, and may generate a 3D image stream using active stereo. These and at least some additional example embodiments of the camera 108 are discussed further, below, in respect of FIGS. 3A, 3B, 4A, 4B, 5A-5D, 6A, and 6B, below.

According to one example embodiment, and as illustrated in FIG. 1, the video capture and playback system 100 includes at least one workstation 156 (such as, for example, a server), each having one or more processors including graphics processing units (GPUs). The at least one workstation 156 may also include storage memory. The workstation 156 receives image data from at least one camera 108 and performs processing of the image data. The workstation 156 may further send commands for managing and/or controlling one or more of the image capture devices 108. The workstation 156 may receive raw image data from the camera 108. Alternatively, or additionally, the workstation 156 may receive image data that has already undergone some intermediate processing, such as processing at the camera 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (such as, for example, a mouse, keyboard, or touchscreen). The client device 164 is operable to display on its display device a user interface for displaying information, receiving user input, and playing back video. For example, the client device may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation 186 and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 8A:
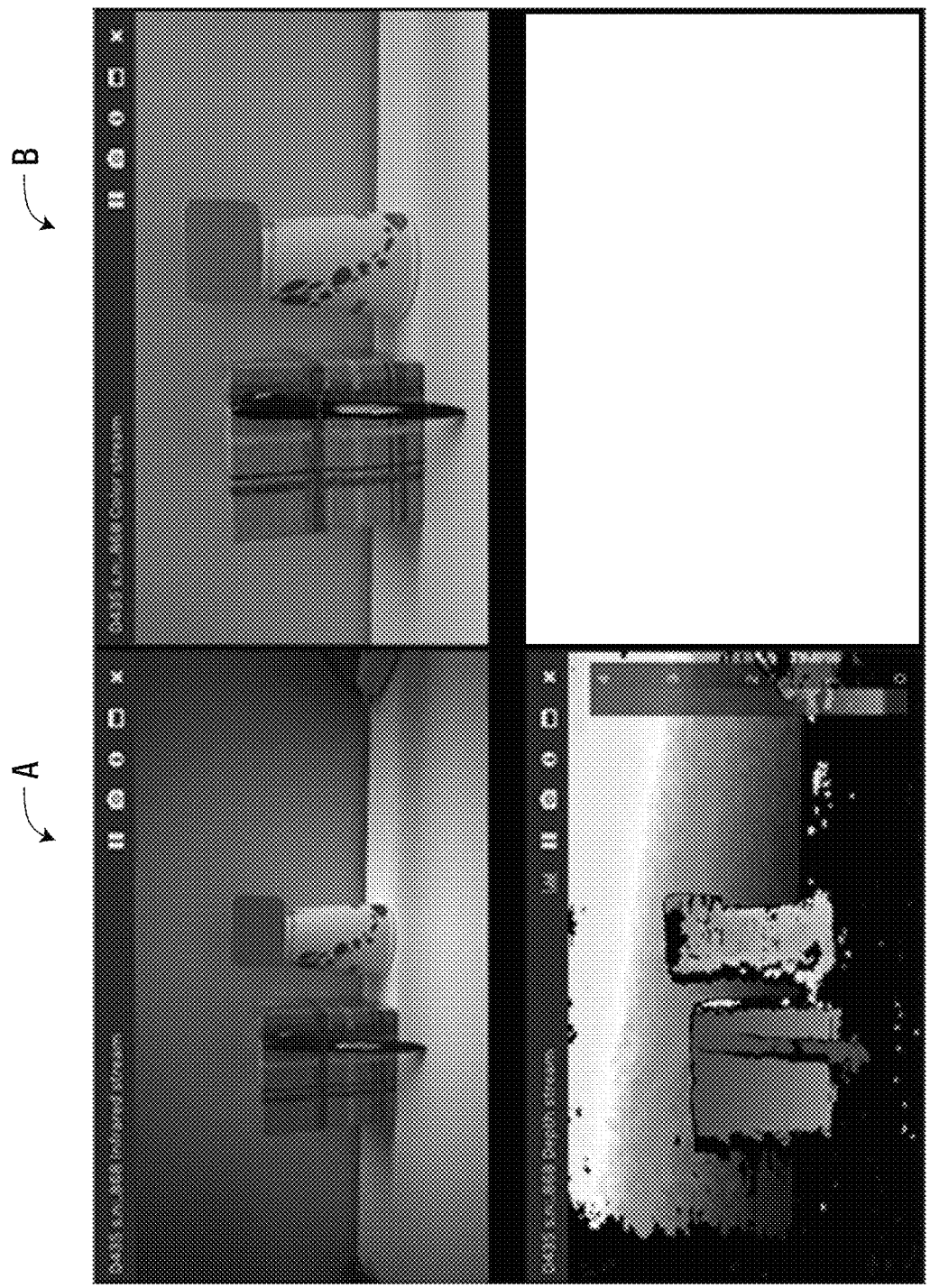
FIG. 8A depicts an infrared image, a color image, and a three-dimensional image generated from a pair of the infrared images.

As mentioned above, it may be desirable for a camera 108 to generate a 3D image stream concurrently with a 2D image stream. Conventionally, 2D and 3D image streams can be concurrently generated by a single camera in a number of ways. One such way is to use a pair of image sensors sensitive to infrared (IR) and monochrome light (each an "IR/monochrome image sensor") to capture images that are the basis of the 3D image stream, and to use a third image sensor capable of generating color images ("color image sensor") to capture images that are the basis of the 2D image stream. FIG. 8A depicts first through third images A-C that represent images captured using a camera that accordingly comprises two IR/monochrome image sensors and a color image sensor. A first image A is a monochrome image captured using one of the camera's IR/monochrome image sensors, a second image B is a color image captured using the camera's color image sensor, and a third image C is a 3D image generated by determining a disparity map by comparing the first image A and another IR/monochrome image (not shown) captured using the camera's other IR/monochrome image sensor. The different shading in the third image C represents depth information.

Figure 8B:
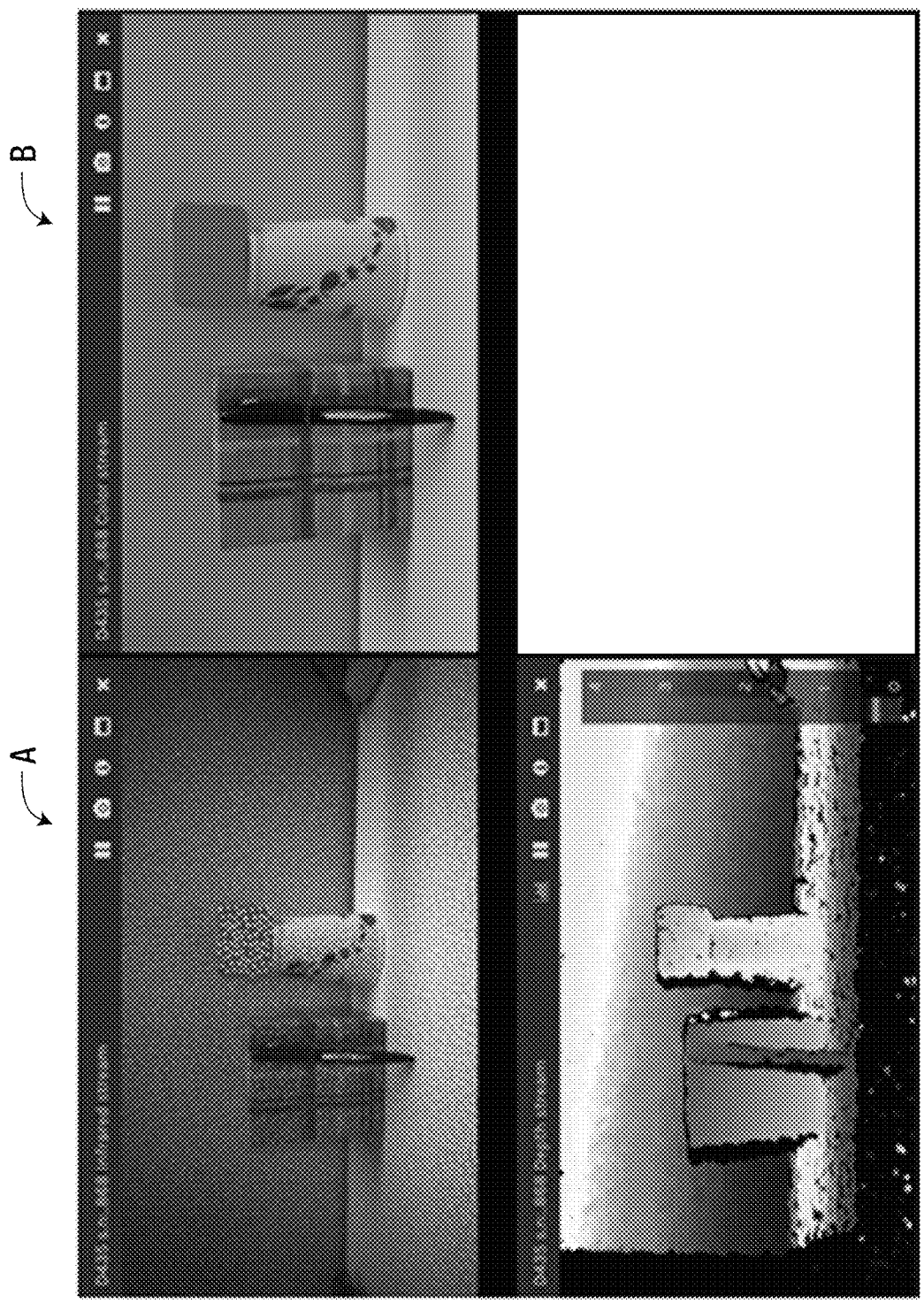
FIG. 8B depicts an infrared image showing a dot pattern, a color image, and a three-dimensional image generated from a pair of the infrared color images.

Certain conventional cameras also include a projector, such as an IR projector, that projects a dot pattern on to a surface being imaged to aid in generating a 3D image. The dot pattern may aid in better distinguishing depth and texture information for display in the 3D image. Using the same camera as that which output the images A-C of FIG. 8A, FIG. 8B again depicts the first image A, which is captured using the IR/monochrome image sensor; the second image B, which is captured using the color image sensor; and the third image C, which is a 3D image generated using the first image A and the camera's other IR/monochrome image sensor. In contrast to FIG. 8A, however, the first image A of FIG. 8B includes a dot pattern projected by an IR projector, which comprises part of the camera. This dot pattern appears in both the first image A and the image (not shown) captured by the camera's other IR/monochrome image sensor, and helps to generate a disparity map of greater detail than the map used to generate the third image C of FIG. 8A. The third image C of FIG. 8B accordingly contains more depth information (e.g., in terms of defining the periphery of certain objects, and identifying the depth at different positions along the surface on which the objects are sitting) than the third image C of FIG. 8A.

One downside to using a conventional camera to generate 2D and 3D image streams is that an additional image sensor, such as the color image sensor described above in respect of FIGS. 8A and 8B, is required to generate a 2D image stream concurrently with the 3D image stream. In at least some example embodiments herein, a camera may use the same image sensor to capture images for a 2D image stream and for generating a 3D image stream, thereby reducing hardware complexity and component cost relative to the conventional camera described above.

Referring now to FIGS. 3A, 3B, 4A, 4B, 5A-5D, 6A, and 6B, there are depicted various example embodiments of cameras 108 and schematic block diagrams thereof, according to at least some example embodiments.

Figure 3A:
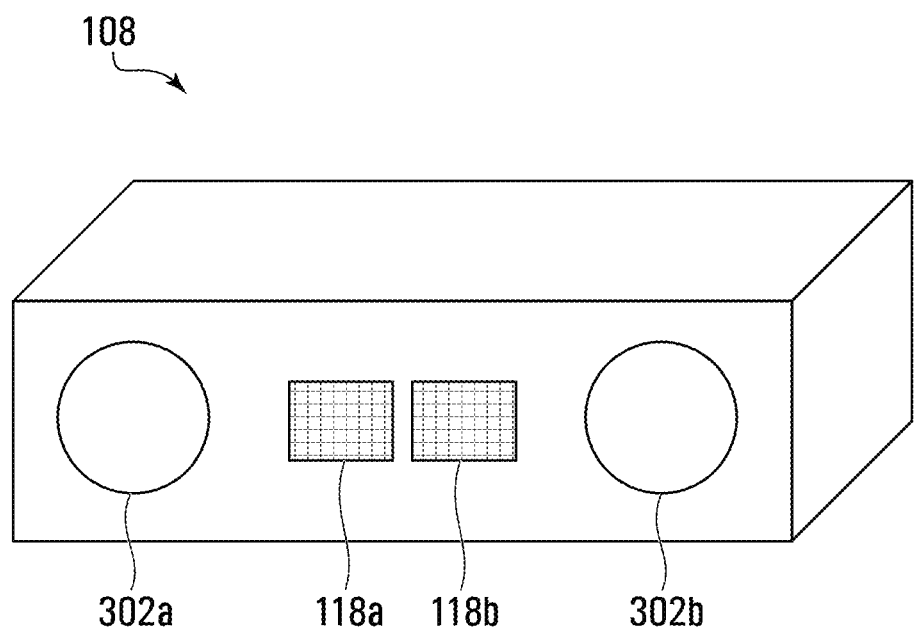
FIG. 3A depicts a camera for generating a two-dimensional and a three-dimensional image stream, according to an example embodiment.
Figure 3B:
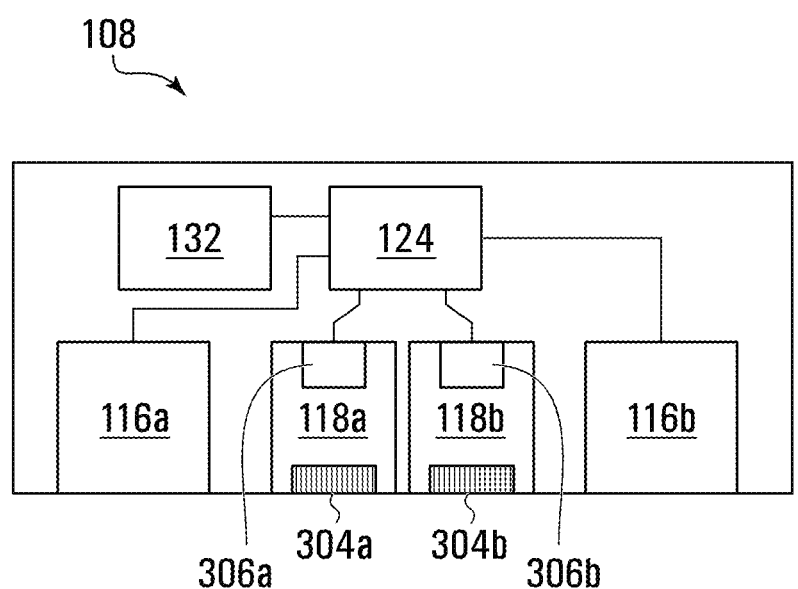
FIG. 3B depicts a schematic block diagram of the camera of FIG. 3A.

FIG. 3A depicts a perspective view of one example embodiment of the camera 108, and FIG. 3B depicts a schematic block diagram of that example embodiment. In the embodiment of FIGS. 3A and 3B, the camera 108 comprises on its front face a first projector 118a, a second projector 118b, a first lens 302a that focuses light on to a first image sensor 116a (shown in FIG. 3B), and a second lens 302b that focuses light on to a second image sensor 116b (shown in FIG. 3B). The lenses 302a,b and projectors 118a,b are horizontally offset from each other and vertically aligned, and are positioned symmetrically about a vertically extending midline of the camera 108. The camera 108 also comprises the processor 124 and memory device 132, with the memory device 132, first and second image sensors 116a,b, and first and second projectors 118a,b being communicatively coupled to the processor 124.

The first projector 118a comprises a first light source 306a and a first mask 304a positioned such that light from the first light source 306a projects a first illumination pattern on to the surface that is to be imaged. Analogously, the second projector 118b comprises a second light source 306b and a second mask 304b positioned such that light from the second light source 306b projects a second illumination pattern on to the surface that is to be imaged. To project the first illumination pattern on to the surface, the processor 124 activates the first light source 306a and deactivates the second light source 306b; to project the second illumination pattern on to the surface, the processor 124 activates the second light source 306b and deactivates the first light source 306a. The first and second masks 304a,b are shaped such that the first and second illumination patterns appear differently when projected on to the surface. The first and second image sensors 116a,b are separated from each other such that the images they respectively capture are sufficiently different to permit those images to be stereoscopically combined, thereby resulting in a 3D image. While the lenses 302a,b and projectors 118a,b in the camera 108 of FIG. 3A and certain other example embodiments herein are vertically aligned and symmetrically positioned about the camera's 108 midline, this need not be the case in all embodiments. For example, in at least some different example embodiments the lenses 302a,b may be vertically offset from each other and/or asymmetrically positioned about the camera's 108 midline, and yet still be sufficiently separated with sufficiently overlapping fields of view to permit images to be stereoscopically combined. Additionally or alternatively, the projectors 118a,b may be located at any place on the camera 108 so long as suitable illumination patterns are projected on to the surface.

Figure 4A:
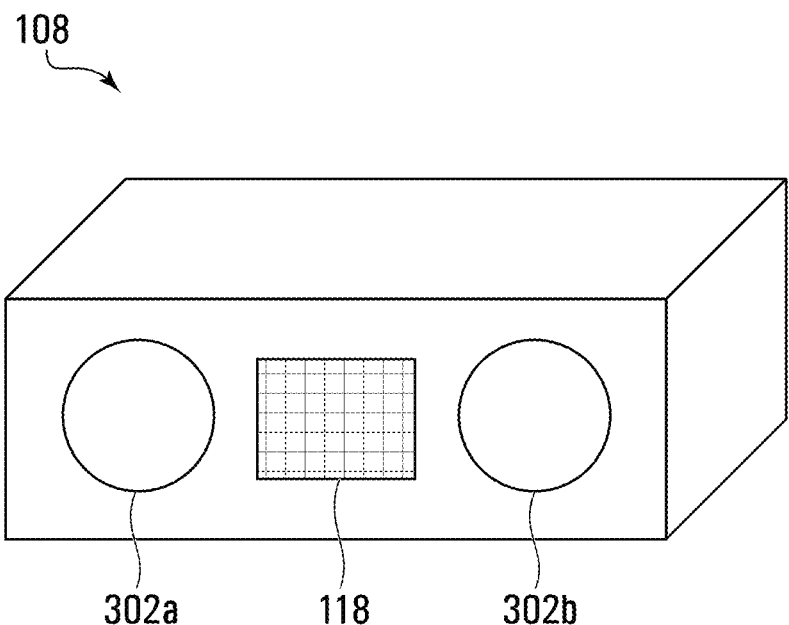
FIG. 4A depicts a camera for generating a two-dimensional and a three-dimensional image stream, according to an example embodiment.
Figure 4B:
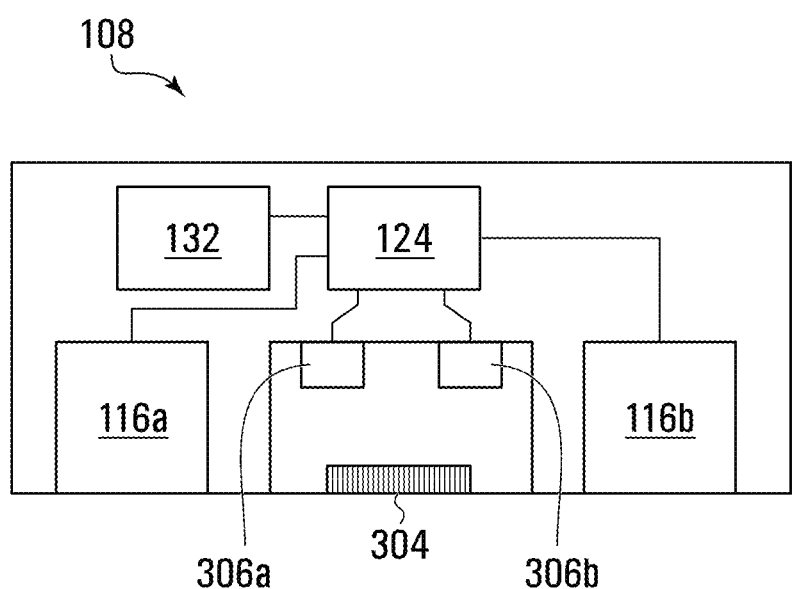
FIG. 4B depicts a schematic block diagram of the camera of FIG. 4A.

FIG. 4A depicts a perspective view of one example embodiment of the camera 108, and FIG. 4B depicts a schematic block diagram of that example embodiment. The camera 108 of FIGS. 4A and 4B is identical to the camera 108 of FIGS. 3A and 3B, except that in the embodiment of FIGS. 4A and 4B a single projector in the form of the first projector 118a is used to project both the first and second illumination patterns. As shown in FIG. 4B, the first projector 118a comprises the first light source 306a, the second light source 306b, and a single mask 304 that is located between the first and second light sources 306a,b. The first and second light sources 306a,b are positioned relative to the mask 304 such that light from the first light source 306a that passes through the mask 304 at a first angle projects the first illumination pattern on to the surface being imaged, while light from the second light source 306b that passes through the mask 304 at a second angle projects the second illumination pattern on to the surface being imaged, with the first and second illumination patterns differing from each other. While the mask 304 is shown as being between the first and second light sources 306a,b in FIG. 4B, in at least some different example embodiments different positioning is suitable. To project the first illumination pattern on to the surface, the processor 124 activates the first light source 306a and deactivates the second light source 306b; to project the second illumination pattern on to the surface, the processor 124 activates the second light source 306b and deactivates the first light source 306a.

Figure 5A:
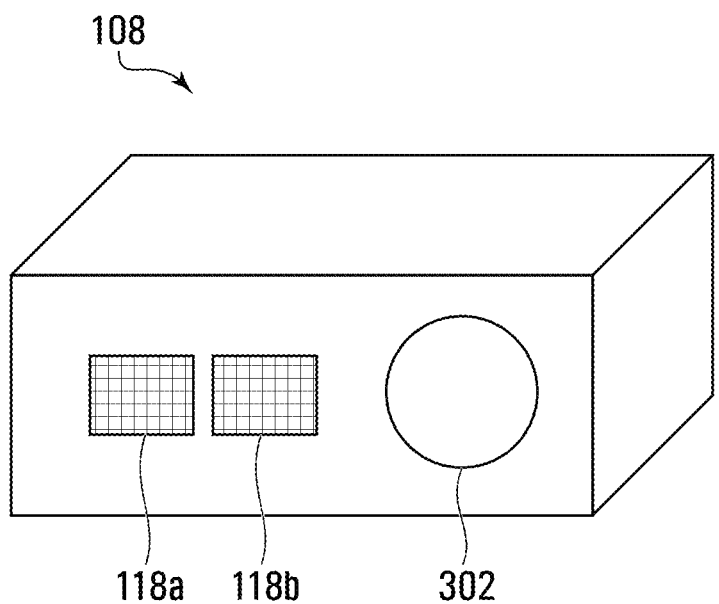
FIGS. 5A and 5B depict cameras for generating a two-dimensional and a three-dimensional image stream, according to additional example embodiments.
Figure 5B:
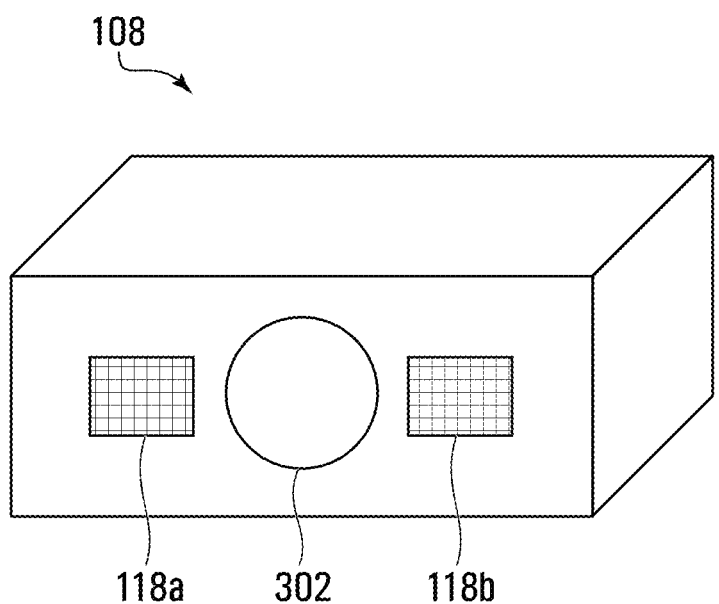
Figure 5C:
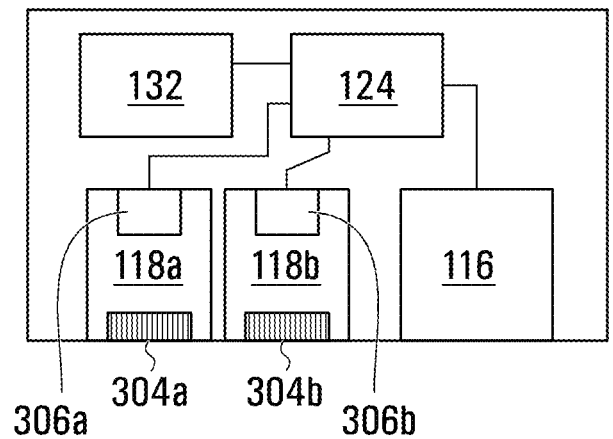
FIGS. 5C and 5D depict schematic block diagrams of the cameras of FIGS. 5A and 5B, respectively.
Figure 5D:
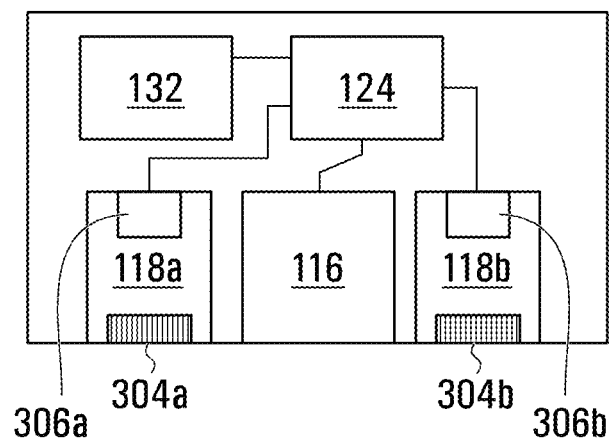

FIGS. 5A and 5B depict perspective views of two additional example embodiments of cameras 108, and FIGS. 5C and 5D respectively depict schematic block diagrams of the cameras 108 of FIGS. 5A and 5B. The cameras 108 of FIGS. 5A and 5B generate 3D image streams by projecting one or more structured light illumination patterns. In the example embodiments described below in respect of FIGS. 5A and 5B, two non-overlapping structured light illumination patterns are projected. As used herein, two or more patterns are "non-overlapping" if, were they projected concurrently on to the surface, those patterns would not overlap each other on the surface.

The camera 108 shown in FIGS. 5A and 5C ("first structured light camera 108") and the camera 108 shown in FIGS. 5B and 5D ("second structured light camera 108") each comprises a single lens 302 that focuses light on to an image sensor 116 (shown in FIGS. 5C and 5D), a first projector 118a, a second projector 118b, a memory device 132, and a processor 124 communicatively coupled to the memory device 132, the image sensor 116, and first and second projectors 118a,b. As with the camera 108 of FIG. 3A, the first projector 118a comprises the first light source 306a and the first mask 304a, and the second projector 118b comprises the second light source 306b and the second mask 304b. The first and second masks 304a,b are shaped so that the patterns projected on to the surface are structured light patterns, with the patterns projected by the first and second masks 304a,b differing from each other and in at least some example embodiments not overlapping with each other. The first and second structured light cameras 108 are identical except that the first and second projectors 118a,b are both to one side of the image sensor 116 in the first structured light camera 108, while the image sensor 116 is between the first and second projectors 118a,b in the second structured light camera 108. Using the first and second projectors 118a,b as depicted in FIGS. 5A-5D is one example of a projector system for the structured light cameras 108; in at least some different example embodiments, the structured light camera 108 may comprise a different type of projector system in which a single mask 304 and two light sources 306a,b are used to generate two illumination patterns, as discussed above in respect of FIG. 4B.

Figure 6A:
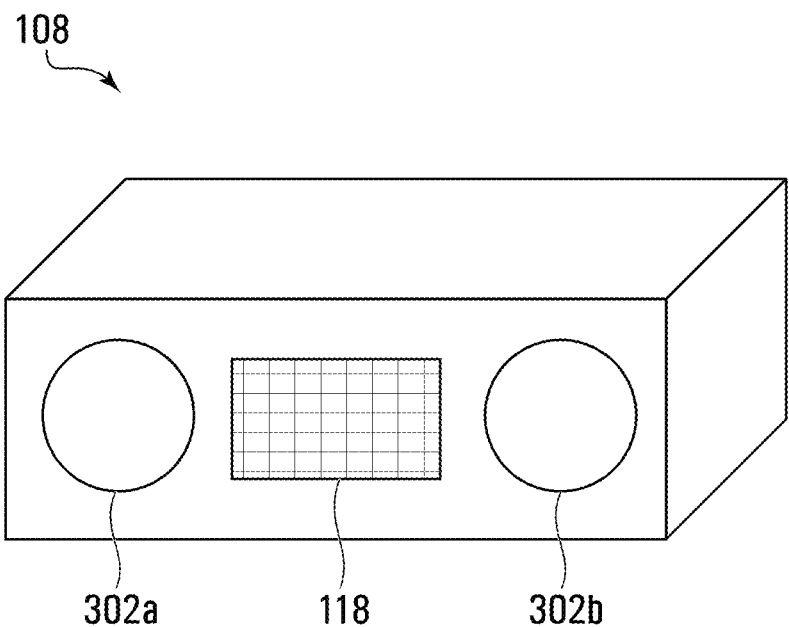
FIG. 6A depicts a camera for generating a two-dimensional and a three-dimensional image stream, according to an example embodiment.
Figure 6B:
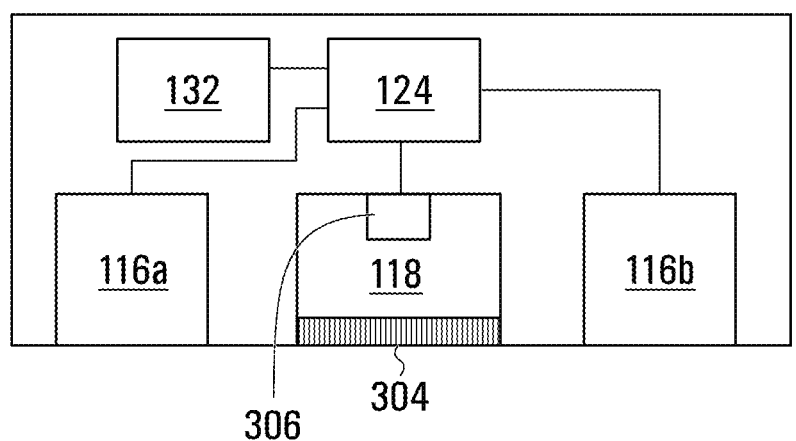
FIG. 6B depicts a schematic block diagram of the camera of FIG. 6A.

Referring now to FIGS. 6A and 6B, there is shown another example embodiment of the camera 108 that comprises first and second lenses 302a,b that focus light respectively on first and second image sensors 116a,b, and a single projector 118 located between the first and second image sensors 116a,b. As is evident from FIG. 6B, this embodiment of the camera 108 also comprises the memory device 132 and the processor 124, with the processor 124 communicatively coupled to the memory device 132, the projector 118, the first image sensor 116a, and the second image sensor 116b. The projector 118 comprises a mask 304 and a light source 306, with the two positioned relative to each other such that light from the light source 306 passes through the mask 304 and projects an illumination pattern on to the surface being imaged.

In at least some example embodiments, the example embodiments of the camera 108 of any of FIGS. 3A, 3B, 4A, 4B, 5A-5D, 6A, and 6B may have its processor 124 and/or memory device 132 moved to the processing appliance 148.

The camera 108 of any of FIGS. 3A, 3B, 4A, 4B, 5A-5D, 6A, and 6B may be used to generate a 2D and a 3D image stream. The camera 108 may do this in a variety of ways. In at least some example embodiments, the camera 108 may be an active stereo camera that uses a single illumination pattern to generate 2D and 3D images; an example of this type of camera 108 is depicted in FIGS. 6A and 6B. The camera 108 may project a first illumination pattern on to a surface using the projector 118. The camera 108 captures, using the image sensors 116a,b, a first set of images of the surface when the first illumination pattern is projected on to the surface. Once the first set of images are captured, the camera 108 ceases to project the first illumination pattern on to the surface. The camera 108 also captures, using the image sensors 116a,b, a second set of images of the surface when the first illumination pattern is absent from the surface. The camera 108 is then able to generate a 3D image by performing a stereoscopic combination using the first set of images, and a 2D image using the second set of images. This may be performed repeatedly in order to generate image streams. An example of this is described in respect of FIG. 9C, described in further detail below.

In at least some other example embodiments, the camera 108 may be an active stereo camera that uses at least two illumination patterns to generate 2D and 3D images; examples of this type of camera 108 are depicted in FIGS. 3A, 3B, 4A, and 4B. The camera 108 may project a first illumination pattern on to the surface, and use the image sensors 116a,b to capture a first set of images of the surface when the first illumination pattern is projected on to the surface. The camera 108 may then cease to project the first illumination pattern on to the surface, and when the first illumination pattern is absent from the surface, project a second illumination pattern that differs from the first illumination pattern on to the surface. The camera 108 may then capture, using the image sensors 116a,b, a second set of images of the surface when the second illumination pattern is projected on to the surface. The camera 108 may then generate a 3D image by performing a stereoscopic combination using the first set of images and a 2D image using the second set of images. The camera 108 may repeatedly perform this method to generate 2D and 3D image streams. An example of this is described in respect of FIG. 9B, described in further detail below.

In at least some other example embodiments, the camera 108 may be a structured light camera that uses at least two illumination patterns (of which at least one is a structured light illumination pattern) to generate 2D and 3D images; examples of this type of camera 108 are depicted in FIGS. 5A-5D. The camera 108 may project a first structured light illumination pattern on to the surface, and capture, using the image sensor 116, a first image of the surface when the first structured light illumination pattern is projected on to the surface. The camera 108 then ceases to project the first structured light illumination pattern on to the surface and, when the first structured light illumination pattern is absent from the surface, projects a second illumination pattern that differs from the first structured light illumination pattern on to the surface. This second illumination pattern may also be a structured light illumination pattern. The camera 108 captures, using the image sensor 116, a second image of the surface when the second illumination pattern is projected on to the surface. The camera 108 is then able to generate a 3D image using the first image, and a 2D image using the first and second images.

Figure 2A:
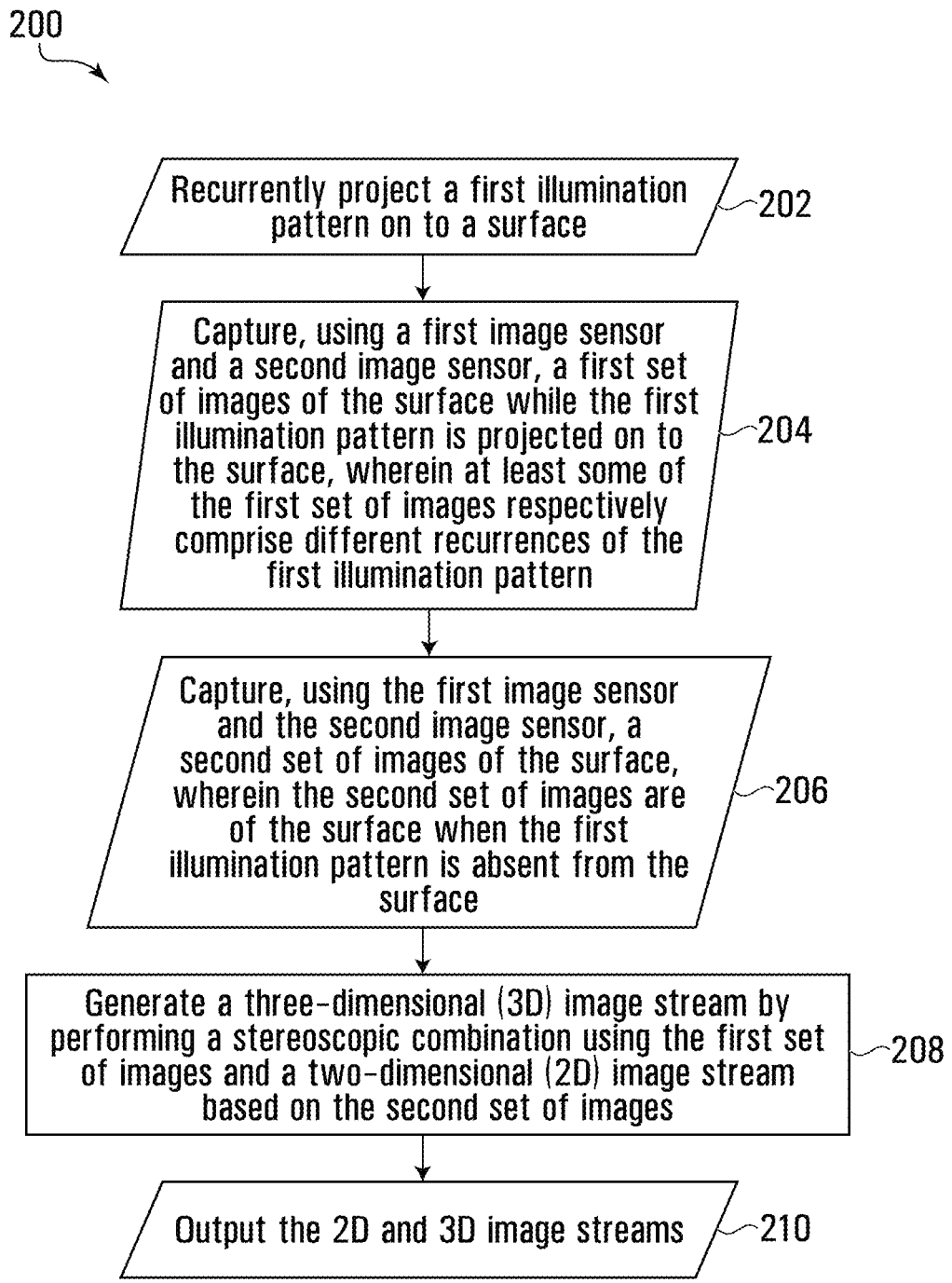
FIGS. 2A and 2B illustrate flowcharts depicting methods for generating a two-dimensional and a three-dimensional image stream, according to example embodiments.
Figure 2B:
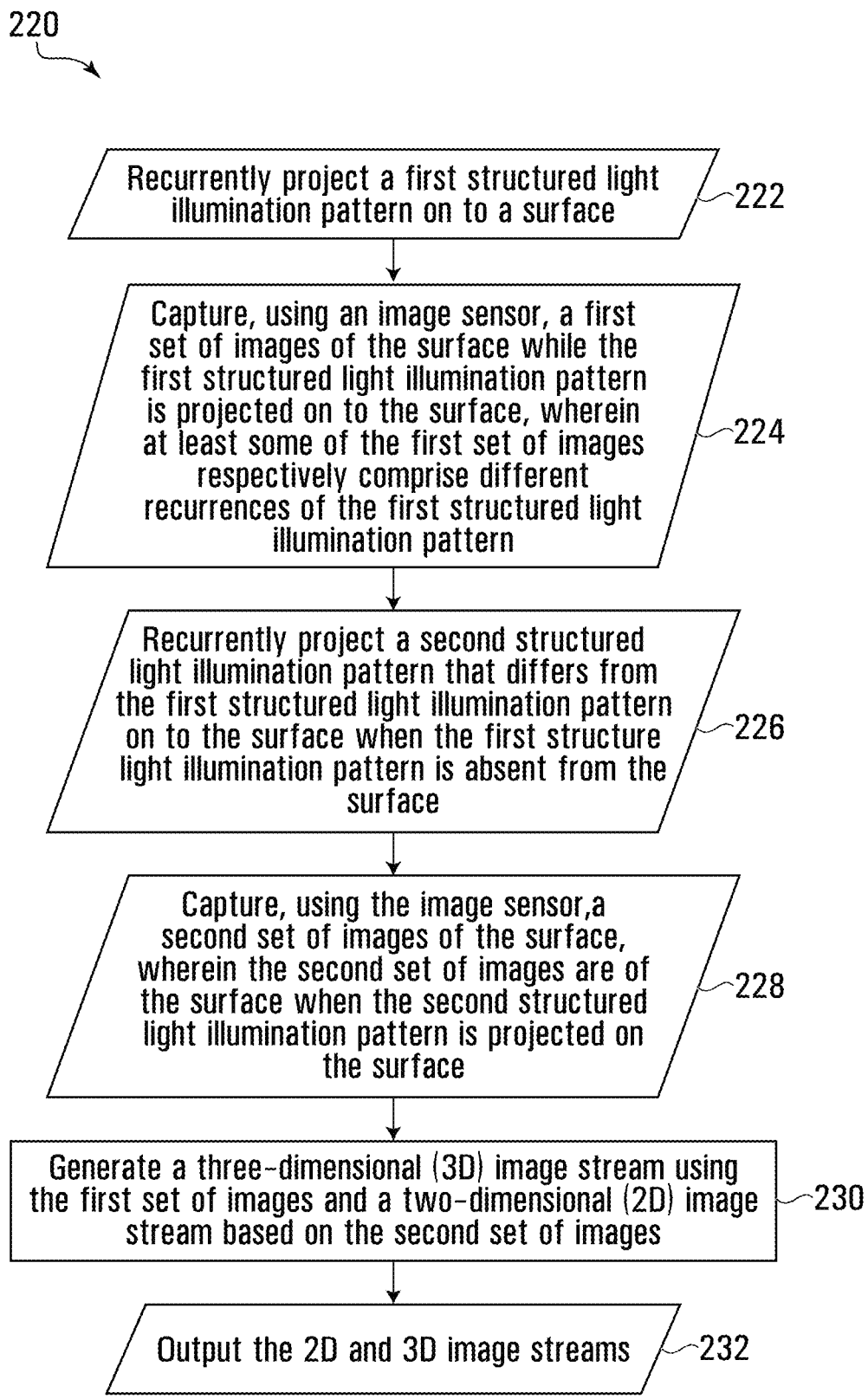

Particular example embodiments of the above-described methods are depicted in FIGS. 2A and 2B as methods 200,220 for generating a 2D and a 3D image stream. The methods 200,220 may be encoded as computer program code and stored in the memory device 132 of any of the example cameras 108 described above. More particularly, the method 200 of FIG. 2A ("active stereo method 200") may be performed by the cameras 108 depicted in FIGS.

3A-4B, while the method 220 of FIG. 2B ("structured light method 220") may be performed by the cameras 108 depicted in FIGS. 5A-5D. Various example implementations of the methods 200,220 are described below in conjunction with FIG. 7, which shows first through third images 702a, b,706, and FIGS. 9A-9C, which depict how different example images are generated at different times. The first image 702a is of a surface 708 and comprises part of a first set of images with an overlaid first illumination pattern 704a, the second image 702b is of the same surface 708 and comprises part of a second set of images with an overlaid second illumination pattern 704b, and the third image 706 is from a 2D image stream that the camera 108 generates using at least one of the first and second images 702a,b, as discussed further below.

Two Image Sensors and Two Illumination Patterns

In at least some example embodiments, the active stereo method 200 may be implemented using the cameras 108 of FIGS. 3A, 3B, 4A, and 4B (i.e., cameras 108 capable of projecting different first and second illumination patterns, and that comprise two image sensors 116a,b permitting generating of 3D images by stereoscopic combination).

The method 200 begins at block 202, where the camera 108 recurrently projects the first illumination pattern 704a on to the surface 708 being imaged. The camera 108 also recurrently projects the second illumination pattern 704b on to the surface 708 when the first illumination pattern 704a is absent from the surface 708. In at least some example embodiments, the camera 108 may alternate projecting the first and second illumination patterns 704a,b on to the surface 708 such that each of the patterns 704a,b is projected for an equal amount of time. For example, the camera 108 may alternate between projecting the first illumination pattern for $\frac{1}{30}$ of a second and projecting the second illumination pattern for $\frac{1}{30}$ of a second.

Figure 7:
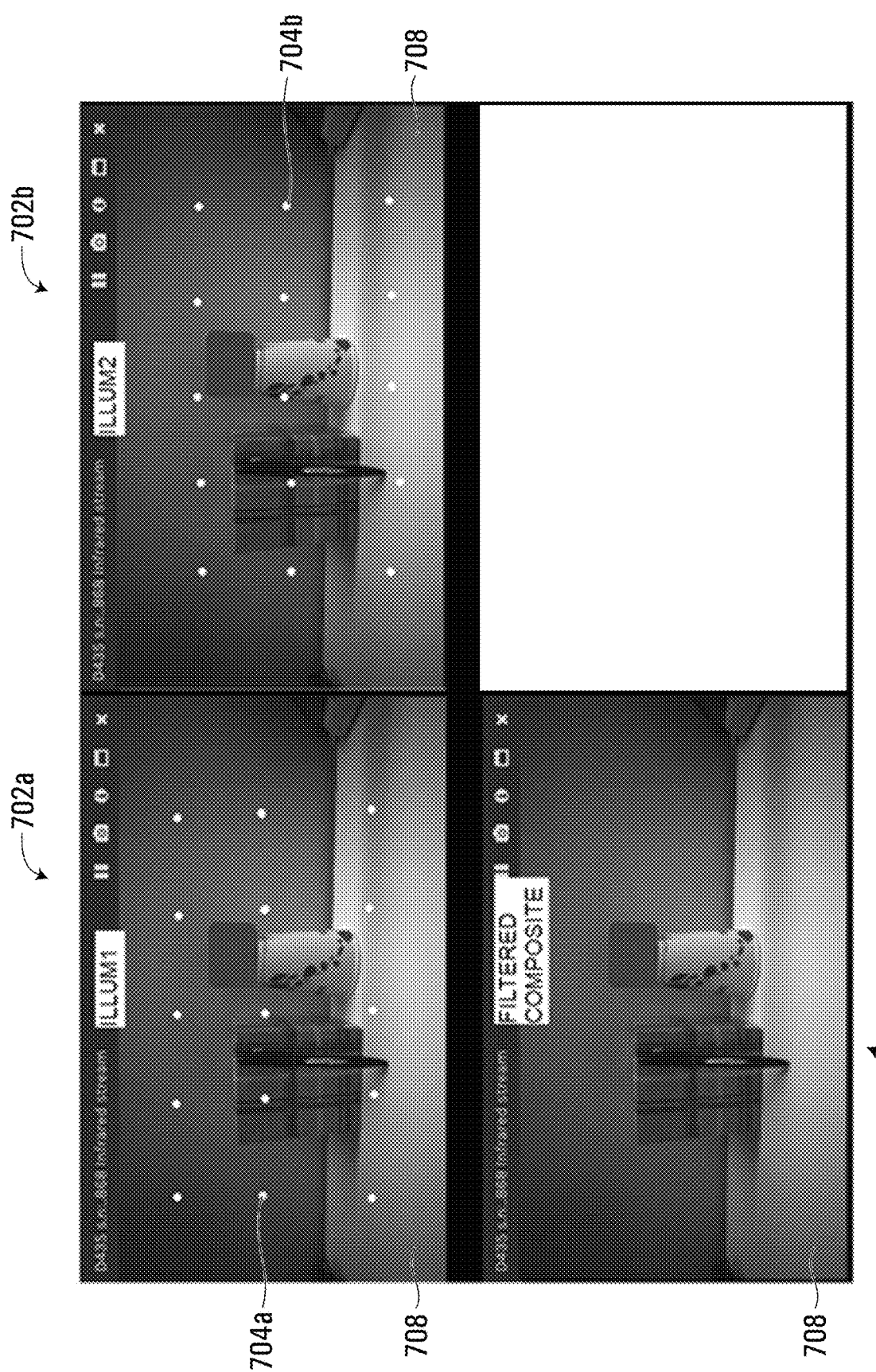
FIG. 7 depicts images from a first set of images and a second set of images respectively depicting a first and a second illumination pattern, and a composite, filtered image generated using the images from the first and second sets of images.

The camera 108 then performs block 204, where, using both image sensors 116a,b, it captures a first set of images of the surface 708 while the first illumination pattern 704a is on the surface 708. At least some of the first set of images respectively comprise different recurrences of the first illumination pattern 704a. The first image 702a of FIG. 7 is an example of an image from the first set of images. In the example in which the first and second illumination patterns 704a,b alternate and are each displayed for $\frac{1}{30}$ of a second, the first set of images may comprise a set of images generated by capturing a pair of images (one with each of the image sensors 116a,b) each time the first illumination pattern 704a is again projected on to the surface 708.

The camera 108 also performs block 206, where, using both image sensors 116a,b, it captures a second set of images of the surface 708 when the first illumination pattern 704a is absent from the surface. The second image 702b of FIG. 7 is an example of an image from the second set of images. In the example in which the first and second illumination patterns 704a,b alternate and are each displayed for $\frac{1}{30}$ of a second, the second set of images may comprise a set of images generated by capturing a pair of images (one with each of the image sensors 116a,b) each time the second illumination pattern 702b is again projected on to the surface 708. Accordingly, in at least some example embodiments all the images comprising the first and second sets of images may depict one of the first and second illumination patterns 704a,b.

At block 208, the camera 108 generates and outputs a 3D image stream by performing a stereoscopic combination using the first set of images and a 2D image stream based at least on the second set of images. In at least the presently described example embodiment, the camera 108 generates each 3D image in the 3D image stream from each concurrently captured pair of images from the first set of images, or from each concurrently captured pair of images from the second set of images. The camera 108 performs a stereoscopic combination of either of those pairs to result in a 3D image, and performs multiple stereoscopic combinations on different pairs of images to generate the 3D image stream.

To generate each 2D image in the 2D image stream, in at least the presently described example embodiment the camera 108 also uses one of the images of the first set of images and one of the images from the second set of images. Using the first and second images 702a,b of FIG. 7 as an example, the first and second illumination patterns 704a,b are mutually exclusive. This is evidenced in FIG. 7 by virtue of the first and second illumination patterns 704a,b not overlapping. Consequently, areas of the surface 708 covered by the first illumination pattern 704a in the first image 702a are not covered by the second illumination pattern 704b in the second image 702b, and vice-versa. The processor 124 accordingly filters the illumination patterns 704a,b from each image in the 2D image stream by identifying pixels in the first image 702a that represent the first illumination pattern 704a; identifying pixels in the second image 702b that correspond in location on the surface 708 to the pixels identified in the first image 702a; and filtering from the first image 702a the first illumination pattern 704a as represented by the pixels identified in the first image 702a using (in the presently described example embodiment, by replacing them with) the pixels identified in the second image 702b. In at least some different example embodiments, the processor 124 may analogously replace pixels representing the second illumination pattern 704b from the second image 702b using corresponding pixels from the first image 702a.

Once the 2D and 3D images are generated, the camera 108 outputs them as 2D and 3D image streams, respectively, at block 210.

Figure 9A:
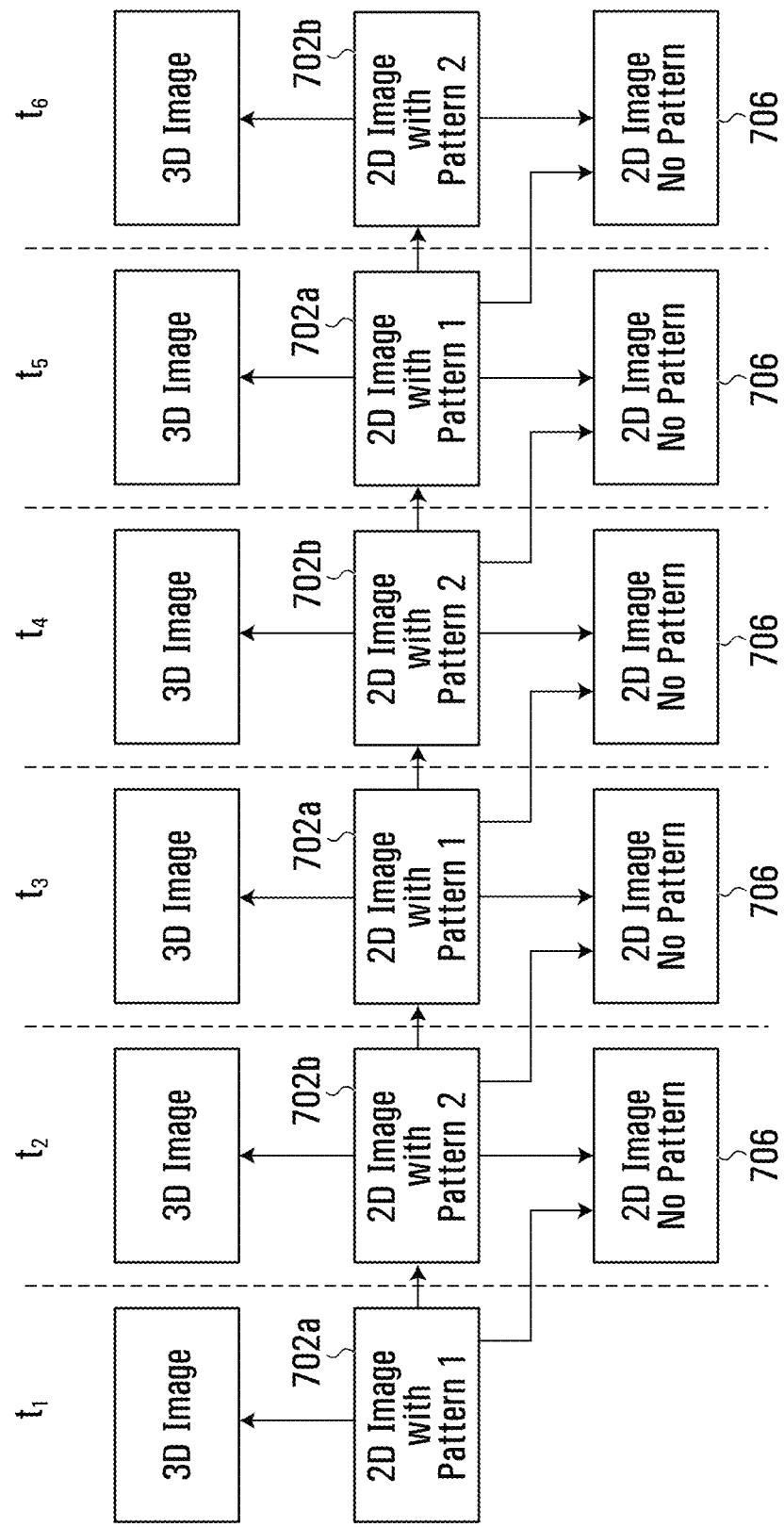
FIGS. 9A-9C depict how two-dimensional and three-dimensional image streams are generated over time, according to additional example embodiments.
Figure 9B:
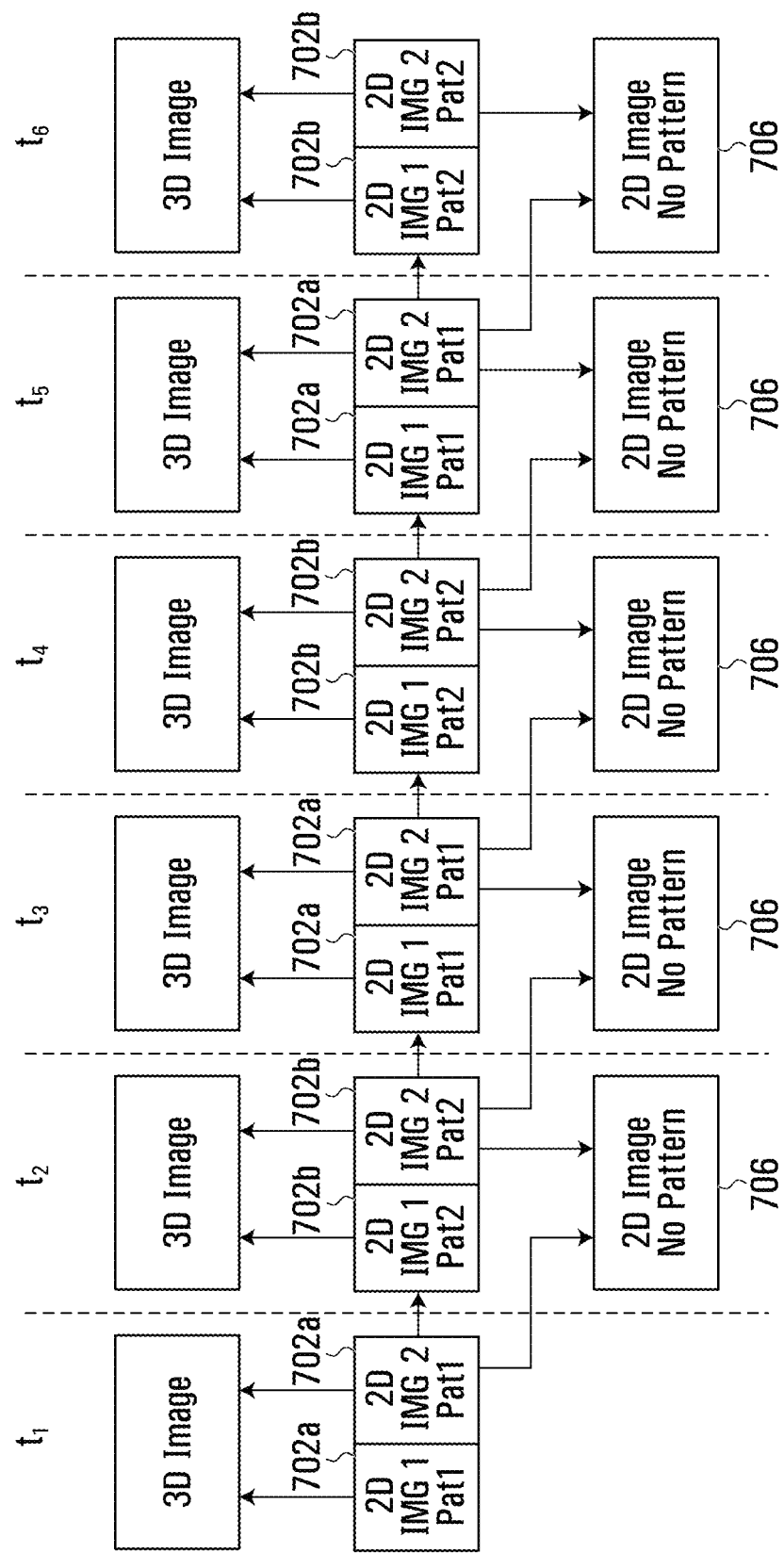

FIG. 9B depicts how the 2D and 3D image streams are generated in an example embodiment using one of the cameras 108 of FIGS. 3A-3D (e.g., use of active stereo and two illumination patterns 704a,b). FIG. 9B depicts twelve images 702a,b captured by the image sensors 116a,b at times $t_1$ to $t_6$: a first set of images comprising the images 702a captured at times $t_1$, $t_3$, and $t_5$ and depicting the first illumination pattern 704a; and a second set of images comprising the images 702b captured at times $t_2$, $t_4$, and $t_6$ and depicting the second illumination pattern 704b. At each of times $t_1$ to $t_6$, one of the images is captured using one of the image sensors 116a and another of the images is captured using the other of the image sensors 116b. Consequently, at each of times $t_1$ to $t_6$ the processor 124 generates a 3D image by performing a stereoscopic combination of a pair of images 702a comprising part of the first set of images (for 3D images generated at times $t_1$, $t_3$, and $t_5$) or a pair of images 702b comprising part of the second set of images (for 3D images generated at times $t_2$, $t_4$, and $t_6$).

The processor 124 also generates a 2D image at each of times $t_2$ through $t_6$. At time $t_2$, the processor 124 takes the second image 702b captured by the second image sensor 116b at time $t_2$ and the first image 702a captured by the second image sensor 116b at time $t_1$, and uses the mutually exclusive illumination patterns 704a,b depicted in those images 702a,b to filter out the illumination patterns 704a,b and present a single 2D image without any illumination pattern 704a,b present. Similarly, at time $t_3$ the processor 124 takes the first image 702a captured by the second image sensor 116b at time $t_3$ and the second image 702b captured by the second image sensor 116*b* at time $t_2$ to generate a 2D image at time $t_3$. This pattern continues at times $t_4$, $t_5$, and $t_6$. Once the latency in the 2D image stream at time $t_1$ is overcome, the framerates of the 2D and 3D image streams are identical and equal to the collective framerate of the images 702*a,b* depicting the illumination patterns 704*a,b*. While FIG. 9B shows the images captured using the second image sensor 116*b* being used to generate the 2D image stream, in at least some different example embodiments the processor 124 may alternatively use images captured using the first image sensor 116*a* for at least some images of the 2D image stream.

Two Image Sensors and One Illumination Pattern

In at least some example embodiments, the active stereo method 200 may be implemented using the camera 108 of FIGS. 6A and 6B (i.e., cameras 108 capable of projecting only the first illumination pattern 704*a* and that comprise two image sensors 116*a,b* permitting generating of 3D images by stereoscopic combination). The method 200 begins at block 202, where the camera 108 recurrently projects the first illumination pattern 704*a* on to the surface 708 being imaged. In at least some example embodiments, the camera 108 may repeatedly project the first illumination pattern 704*a* for a period of time and then cease projecting the first illumination pattern 704*a* for another period of time. At block 204, using both image sensors 116*a,b* the camera 108 captures the first set of images of the surface 708 while the first illumination pattern 704*a* is projected on to the surface 708. At least some of the first set of images respectively comprise different recurrences of the first illumination pattern 704*a*. At block 206, using both image sensors 116*a,b* the camera 108 also captures the second set of images of the surface 708 when the first illumination pattern 704*a* is absent from the surface 708. In at least some example embodiments, the periods of time for which the camera 108 projects the first illumination pattern 704*a* and does not project the first illumination pattern 704*a* are equal. For example, the camera 108 may alternate between projecting the first illumination pattern for $\frac{1}{30}$ of a second and then projecting nothing for $\frac{1}{30}$ of a second. Accordingly, in at least some example embodiments all the images comprising the first set of images may comprise the first illumination pattern 704*a*, and all the images comprising the second set of images may comprise no illumination pattern.

At block 208, the camera 108 generates and outputs a 3D image stream by performing a stereoscopic combination using the first set of images and a 2D image stream based at least on the second set of images. In at least the presently described example embodiment, the camera 108 generates each 3D image in the 3D image stream from each concurrently captured pair of images from the first set of images, and from each concurrently captured pair of images from the second set of images. The camera 108 performs a stereoscopic combination of either of those pairs to result in a 3D image, and performs multiple stereoscopic combinations on different pairs of images to generate the 3D image stream. By generating 3D images from image pairs regardless of whether those image pairs comprise an illumination pattern 704*a,b* or not, the framerate of the 3D image stream is maintained at the overall rate of image capture. For example, if the camera 108 projects the first illumination pattern for $\frac{1}{30}$ of a second and then nothing for $\frac{1}{30}$ of a second, real-time output of the 3D image stream is nonetheless 30 frames per second.

To generate each 2D image in the 2D image stream, in at least the presently described example embodiment the camera 108 selects sequentially appearing images from the second set of images such that the 2D image stream comprises those sequentially appearing images and excludes the first set of images. The images that are selected from the second set of images may be selected from either of the image sensors 116*a,b*. As the camera does not project anything while the second set of images is captured, the 2D image stream lacks the first illumination pattern 704*a*. The framerate of the 2D image stream is lower than the overall rate of image capture. For example, if the camera 108 projects the first illumination pattern for $\frac{1}{30}$ of a second and then nothing for $\frac{1}{30}$ of a second, real-time output of the 2D image stream is 15 frames per second.

Once the 2D and 3D images are generated, the camera 108 outputs them as 2D and 3D image streams, respectively, at block 210.

Figure 9C:
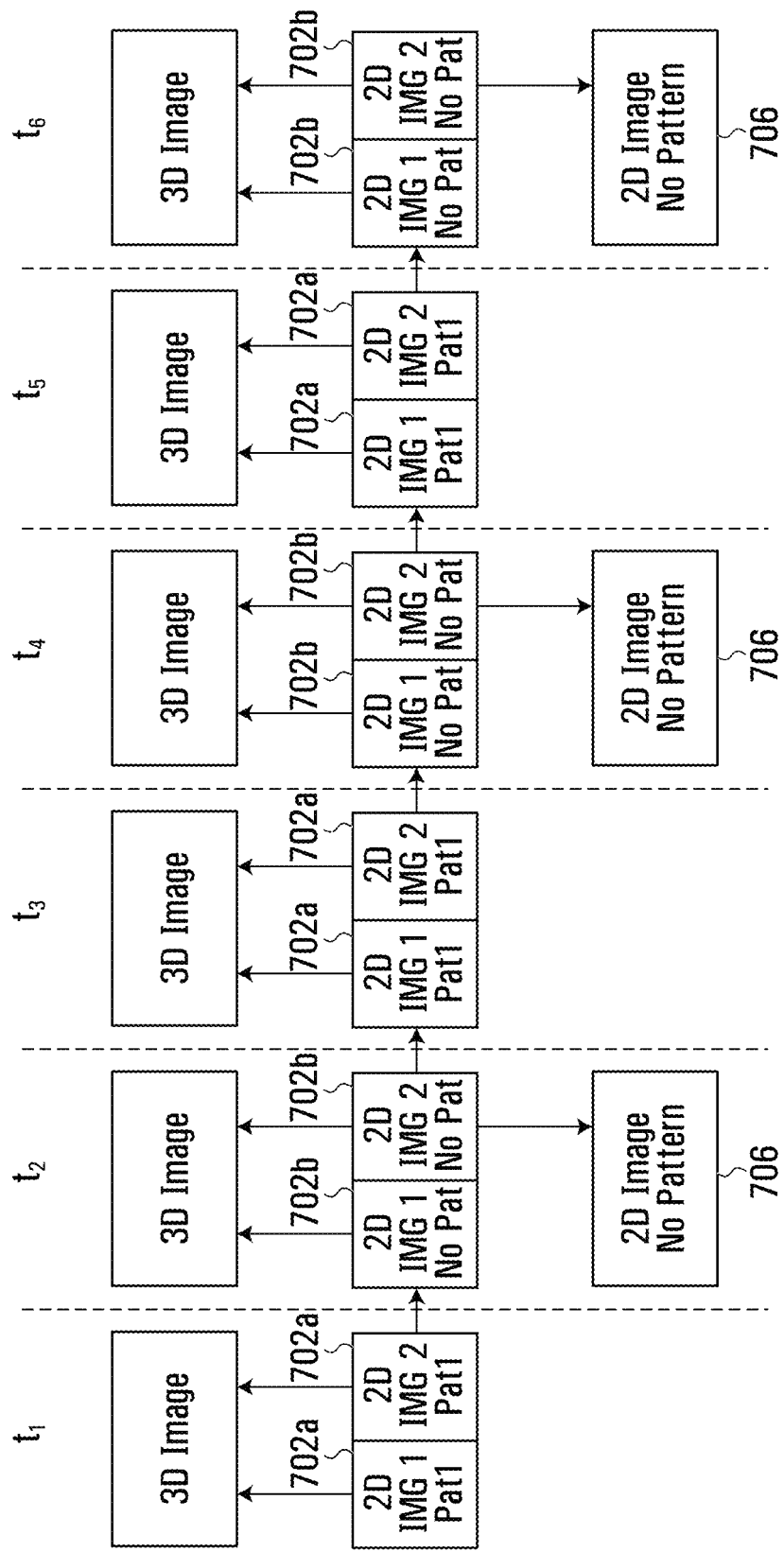

FIG. 9C depicts how the 2D and 3D image streams are generated in an example embodiment using the camera 108 of FIGS. 6A and 6B (e.g., use of active stereo and one illumination patterns 704*a*). FIG. 9C depicts twelve images 702*a,b* captured by the image sensors 116*a,b* at times $t_1$ to $t_6$: a first set of images comprising the images 702*a* captured at times $t_1$, $t_3$, and $t_5$ and depicting the first illumination pattern 704*a*; and a second set of images comprising the images 702*b* captured at times $t_2$, $t_4$, and $t_6$ and lacking any illumination pattern 704. At each of times $t_1$ to $t_6$, one of the images is captured using one of the image sensors 116*a* and another of the images is captured using the other of the image sensors 116*b*. Consequently, at each of times $t_1$ to $t_6$ the processor 124 generates a 3D image by performing a stereoscopic combination of a pair of images 702*a* comprising part of the first set of images (for 3D images generated at times $t_1$, $t_3$, and $t_5$) or a pair of images 702*b* comprising part of the second set of images (for 3D images generated at times $t_2$, $t_4$, and $t_6$).

The processor 124 also generates a 2D image at each of times $t_2$, $t_4$, and $t_6$. At each of these times, the processor 124 takes the second image 702*b* captured by the second image sensor 116*b* at that time, which lacks any illumination pattern 704, and uses this image 702*b* for the 2D image stream. The processor 124 does not generate any 2D image at times $t_1$, $t_3$, or $t_5$. Since there is only one illumination pattern 704*a* used, the processor 124 does not filter out that illumination pattern 704*a* out and instead bases the 2D image stream on the second set of images, which lacks any illumination pattern. This has the effect of causing the 2D image stream in the embodiment depicted in FIG. 9C to be half that of the embodiment depicted in FIG. 9B. While FIG. 9C shows the images captured using the second image sensor 116*b* being used to generate the 2D image stream, in at least some different example embodiments the processor 124 may alternatively use images captured using the first image sensor 116*a* for at least some images of the 2D image stream.

One Image Sensor and Two Illumination Patterns (Structured Light)

In at least some example embodiments, the structured light method 220 may be implemented using the cameras 108 of FIGS. 5A to 5D (i.e., cameras 108 capable of projecting the first and second illumination patterns 704*a,b* and that use only one of the image sensors 116 to capture the first and second sets of images, thereby permitting generation of the 3D image stream using structured light methods).

The method 220 begins at block 222, where the camera 108 recurrently projects the first structured light illumination pattern 704*a* on to the surface 708 being imaged. The camera 108 proceeds to block 224 where it captures, using a single image sensor 116, a first set of images of the surface 708 while the first structured light illumination pattern 704a is projected on to the surface 708, wherein at least some of the first set of images respectively comprise different recurrences of the first structured light illumination pattern 704a. The method 220 proceeds to block 224 where the camera 108 also recurrently projects a second structured light illumination pattern 704b on to the surface 708 when the first structured light illumination pattern 704a is absent from the surface 708. In at least some example embodiments, the camera 108 may alternate projecting the first and second illumination patterns 704a,b on to the surface 708 such that each of the patterns 704a,b is projected for an equal period of time. For example, the camera 108 may alternate between projecting the first illumination pattern for 1/30 of a second and projecting the second illumination pattern for 1/30 of a second. At least the first illumination pattern 704a comprises a structured light illumination pattern, thereby permitting the processor 124 to generate a 3D image stream without creating a disparity map from images captured using two image sensors 116.

The camera 108 then performs blocks 228 where it captures, using the image sensor 116, a second set of images of the surface 708. The second set of images are of the surface 708 when the first structured light illumination pattern 704a is absent from the surface 708, and thereby depict the second structured light illumination pattern 704b. In at least some example embodiments, both the first and second illumination patterns 704a,b are structured light illumination patterns that differ from each other such that they are mutually exclusive (i.e., areas of the surface 708 covered by the first illumination pattern 704a in the first image 702a are not covered by the second illumination pattern 704b in the second image 702b, and vice-versa). In at least some different example embodiments, only one of the two illumination patterns 704a,b is a structured light illumination pattern.

At block 230, the camera 108 generates and outputs a 3D image stream based on the first set of images by applying a structured light methodology. In the example embodiments in which the first and second illumination patterns 704a,b are structured light illumination patterns, the processor 124 renders a 3D image from the first and second sets of images, and consequently is able to generate a 3D image stream at the combined framerate of the first and second sets of images. In example embodiments in which only one of the light illumination patterns 704a,b is a structured light illumination pattern, the 3D image stream is generated using the image set depicting only that light illumination pattern 704a,b and is limited to the framerate of those illuminated frames.

To generate each 2D image in the 2D image stream, in at least the presently described example embodiment the camera 108 also uses one of the images of the first set of images and an immediately following image from the second set of images. As the first and second illumination patterns 704a,b are mutually exclusive, areas of the surface 708 covered by the first illumination pattern 704a in the first image 702a are not covered by the second illumination pattern 704b in the second image 702b, and vice-versa. The processor 124 accordingly filters the first illumination pattern 704a out of each of the first set of images in the 2D image stream by identifying pixels in the first image 702a that represent the first illumination pattern 704a; identifying pixels in the second image 702b that correspond in location on the surface 708 to the pixels identified in the first image 702a; and filtering from the first image 702a the first illumination pattern 704a as represented by the pixels identified in the first image 702a using (in the presently described example embodiment, by replacing them with) the pixels identified in the second image 702b. In at least some different example embodiments, the processor 124 may analogously filter the second illumination pattern 704b from each of the second set of images using corresponding pixels from the first image 702a.

Once the 2D and 3D images are generated, the camera 108 outputs them as 2D and 3D image streams, respectively, at block 232.

FIG. 9A depicts how the 2D and 3D image streams are generated in an example structured light embodiment in which one of the cameras 108 of FIGS. 5A-5D is used to generate the image streams using two mutually exclusive structured light illumination patterns 704a,b. FIG. 9A depicts six consecutive images captured by the image sensor 116 at times $t_1$ to $t_6$: a first set of images comprising a series of first images 702a each depicting the first illumination pattern 704a (times $t_1$, $t_3$, and $t_5$) alternates with a second set of images comprising a series of second images 702b each depicting the second illumination pattern 704b (times $t_2$, $t_4$, and $t_6$). At time $t_1$ the processor 124 generates a 3D image from the first image 702a at time $t_1$, and does not generate a 2D image as it is unable to filter out the first illumination pattern 704a without one of the second images 702b. At time $t_2$, the processor 124 generates another 3D image from the second image 702b and time $t_2$ and generates a single 2D image from the first image 702a at time $t_1$ and the second image 702b at time $t_2$. As the illumination patterns 704a,b on those first and second images 702a,b do not overlap, the processor 124 is able to filter the illumination patterns 704a,b out and produce a 2D image at time $t_2$ that is free of both patterns 704a,b. Similarly, at time $t_3$ the processor 124 generates a 3D image from the first image 702a captured at time $t_3$ and a 2D image from the second image 702b captured at time $t_2$ and the first image 702a captured at time $t_3$. This pattern continues at times $t_4$, $t_5$, and $t_6$. Once the latency in the 2D image stream at time $t_1$ is overcome, the framerates of the 2D and 3D image streams are identical and equal to the collective framerate of the images 702a,b depicting the illumination patterns 704a,b.

Additional Example Embodiments

Variations on the above-described example embodiments are possible.

Figure 10A:
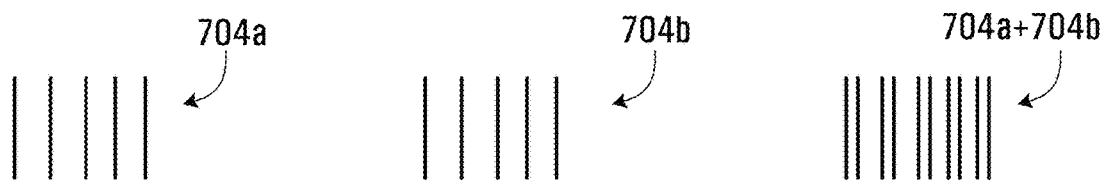
FIGS. 10A-10D depict example illumination patterns, according to additional example embodiments.
Figure 10B:
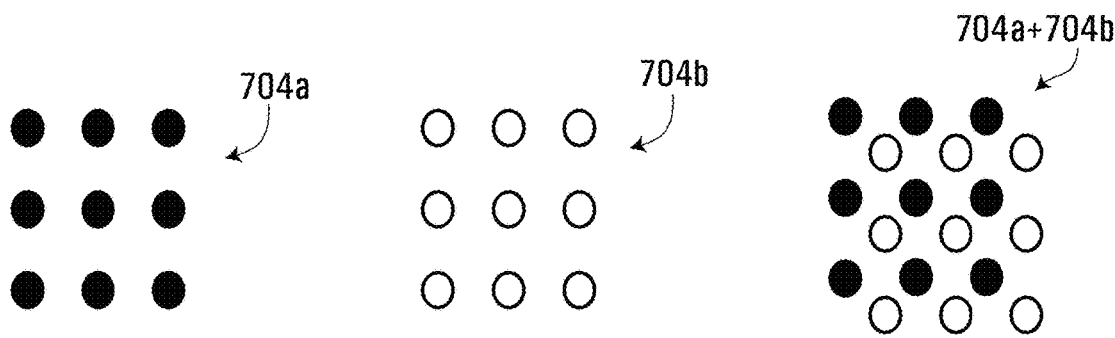
Figure 10C:
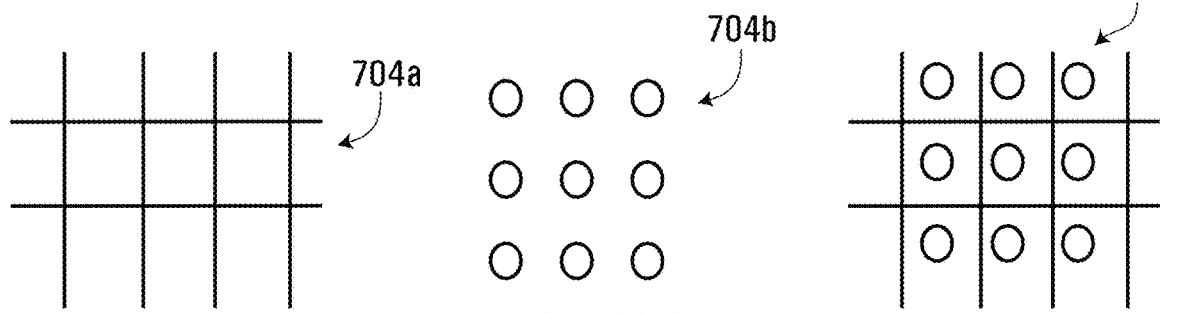
Figure 10D:
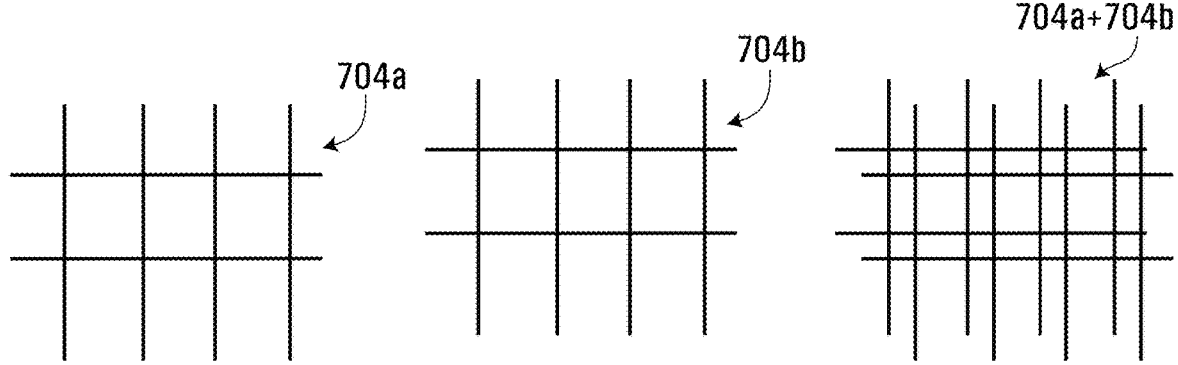

For example, while each of the first and second illumination patterns 704a,b is shown as a dot pattern in FIG. 7, in at least some different example embodiments (not depicted), one or both may be another suitable pattern. Each of FIGS. 10A-10D depicts an example first illumination pattern 704a, an example second illumination pattern 704b, and how the first and second illumination patterns 704a,b would appear if concurrently projected on to the surface 308. FIG. 10A depicts the first illumination pattern 704a as a series of parallel lines and the second illumination pattern 704b as a series of parallel lines offset from the lines comprising the first illumination pattern 704a such that the illumination patterns 704a,b, if they were concurrently projected on to the surface 308, would not overlap. FIG. 10B depicts the first illumination pattern 704a as a field of dots and the second illumination pattern 704b as a field of dots offset from the dots comprising the first illumination pattern 704a such that the illumination patterns 704a,b, if they were concurrently projected on to the surface 308, would not overlap. FIG. 10O depicts the first illumination pattern 704a as a grid formed from lines and the second illumination pattern 704b as a field of dots positioned such that the illumination patterns 704a,b, if they were concurrently projected on to the surface 308, would not overlap (i.e., the dots of the second illumination pattern 704b are positioned in the white space of the grid of the first illumination pattern 704a). FIG. 10D depicts the first illumination pattern 704a as a grid formed from lines and the second illumination pattern 704b as an identical grid offset relative to the grid of the first illumination pattern 704a. As both the first and second illumination patterns 704a,b are grids, portions of them overlap each other when overlaid as FIG. 10D shows. The portions of the surface 308 that both illumination patterns 704a,b overlap are those portions of the 2D image stream from which the illumination patterns 704a,b are not filtered when each of the captured images always comprises one of the illumination patterns 704a,b.

As another example, the integration time for the images of the first and second sets of images may vary. In at least some example embodiments, such as the ones described above, they may be identical and correspond to the actual amount of time one of the illumination patterns 704a,b is present on the surface 708, or the actual amount of time the surface 708 is free from one of the illumination patterns 704a,b. Additionally or alternatively, the framerate of one or both of the 2D and 3D image streams may vary. In at least some example embodiments, they may be identical; this may correspond to the images of the first and second sets of images having identical integration times. In at least some different example embodiments, the framerates may differ. For example, when performing the method 200 using two image sensors 116a,b and only the first illumination pattern 704a, instead of alternating between projecting the first illumination pattern 704a and not projecting the first illumination pattern 704a for equal periods of time, the camera 108 may project the first illumination pattern 704a for ¼ of the time and not project any illumination pattern for ¾ of the time. The camera 108 may accordingly capture one pair of images with the first illumination pattern 704a as part of the first set of images for every three pairs of images having no illumination pattern as part of the second set of images. In at least some example embodiments in which the 2D image stream is prioritized over the 3D image stream, more frames (measured in one or both of frame number and integration time) may lack any illumination pattern 704 than comprise an illumination pattern 704; analogously, in at least some example embodiments in which the 3D image stream is prioritized over the 2D image stream, more frames (measured in one or both of frame number and integration time) may comprise an illumination pattern 704 than lack an illumination pattern 704.

As priority between the 2D and 3D image streams vary, the number of frames and/or integration time of frames showing an illumination pattern 704 and frames that do not may accordingly vary. Priority may, for example, change in real time as the camera 108 captures video. For example, the camera 108 may prioritize the 3D stream over the 2D stream, and consequently a certain percentage of the images 702 may comprise an illumination pattern 704. The priority may then change as a result of a particular event, such as an object classification; for example, the camera 108 may detect a person or face and then prioritize the 2D image stream for a certain period of time so as to permit the system 100 to apply 2D video analytics. This may comprise lowering the percentage of images 702 that depict the illumination pattern 704. Analogously, when the 3D image stream increases in priority relative to the 2D video stream, the camera 108 may increase the percentage of images 702 that depict the illumination pattern 704.

In at least some additional example embodiments, the rate at which one or both of the first and second sets of images are captured may vary with the amount of motion in at least one of the first and second sets of images. For example, the camera 108 may begin by capturing the first and second sets of images at an initial framerate, and then determine an amount of motion in at least one of those sets of images. Determining the amount of motion may comprise determining motion vectors for different portions of one or both of the images, and then determining average motion over at least a portion of one of the images. Additionally or alternatively, determining the amount of motion may comprise identifying the highest scalar value of any motion vector over at least a portion of one of the images. Regardless of how the amount of motion is determined, when the amount of motion equals or exceeds a framerate increase threshold, the camera 108 may increase the rate at which at least one of the first and second sets of images is captured.

In at least some additional example embodiments, any of the illumination patterns may be varied when at least one of the sets of images satisfies an illumination pattern change threshold. For example, the illumination pattern change threshold may be a threshold amount of motion detected in at least one of the sets of images, as described above. Additionally or alternatively, the illumination pattern change threshold may be a threshold amount of depth being present in at least one of the sets of images. For example, the camera 108 may determine an amount of depth information present in at least one of the first and second sets of images, and change at least one of the first and second illumination patterns 704a,b upon determining that that depth information equals or exceeds the illumination pattern change threshold. Changing an illumination pattern, such as in response to detected motion or depth, may comprise adding more features to the illumination pattern for areas of the surface 708 that are experiencing more than the threshold amount of motion or that have low depth information. For example, in the event the illumination patterns 704a,b of FIG. 10B are used, the dot density of the portions of the illumination patterns 704a,b projected on to those areas of the surface 708 may be increased.

As another example, the camera 108 in at least some example embodiments further comprises one or both of a third image sensor and a third illumination pattern. The third illumination pattern differs from the first and second illumination patterns 704a,b and is projected on to the surface 708 when the first and second illumination patterns 704a,b are absent from the surface 708. A third set of images may be captured, with at least some of the third set of images respectively comprising different recurrences of the third illumination pattern.

In certain additional example embodiments, the image sensors 116 of the camera 108 may be sensitive to various wavelengths of light. For example, in the example embodiments discussed above in respect of FIG. 2, the image sensors 116a,b are sensitive to visible light and IR light (including near infrared and short wave infrared light). In at least some different example embodiments, any one or more of the image sensors 116 may be sensitive to different wavelength ranges of light, such as visible light only; ultraviolent (UV) light and visible light; and more generally any one or more ranges of wavelengths that can be used to image the illumination pattern 704 and surface 708.

It is contemplated that any part of any aspect or embodiment discussed in this specification can be implemented or combined with any part of any other aspect or embodiment discussed in this specification.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A method comprising:
projecting a first illumination pattern on to a surface;
capturing, using a plurality of image sensors, a first set of images of the surface when the first illumination pattern is projected on to the surface;
ceasing to project the first illumination pattern on to the surface;
capturing, using the plurality of image sensors, a second set of images of the surface when the first illumination pattern is absent from the surface; and
generating:
a three-dimensional (3D) image by performing a stereoscopic combination using the first set of images; and
a two-dimensional (2D) image using the second set of images,
wherein the method is repeatedly performed to generate a 2D image stream and a 3D image stream.

2. The method of claim 1, wherein the 2D image is one of the second set of images.

3. The method of claim 1, wherein an integration time for each image of the 2D image stream is longer than an integration time for each image of the 3D image stream.

4. The method of claim 3, wherein a rate at which the second set of images is captured is higher than a rate at which the first set of images is captured.

5. The method of claim 3, further comprising:
determining an amount of motion in at least one of the 2D and 3D image streams; and
when the amount of motion equals or exceeds a framerate increase threshold, increasing a rate at which at least one of the first and second sets of images is captured.

6. The method of claim 3, further comprising:
determining whether at least one of the 2D and 3D image streams satisfies an illumination pattern change threshold; and
when the illumination pattern change threshold is satisfied, replacing the first illumination pattern with a second illumination pattern that differs from the first illumination pattern, wherein at least a subsequent one of the first set of images comprises the second illumination pattern.

7. The method of claim 6, wherein determining when the illumination pattern change threshold is satisfied comprises:
determining an amount of motion in at least one of the 2D and 3D image streams; and
determining that the illumination pattern threshold is satisfied when the amount of motion in the at least one of the 2D and 3D image streams equals or exceeds the illumination pattern change threshold.

8. The method of claim 6, wherein determining when the illumination pattern change threshold is satisfied comprises:
determining an amount of depth information present in the 3D image stream; and
determining that the illumination pattern change threshold is satisfied when the amount of depth information equals or exceeds the illumination pattern change threshold.

9. The method of claim 6, wherein each of the first and second illumination patterns comprises a field of dots, and wherein the field of dots comprising the second illumination pattern has a higher density than the field of dots comprising the first illumination pattern.

10. The method of claim 6, wherein projecting the first illumination pattern comprises projecting light through a first mask, and wherein projecting the second illumination pattern comprises projecting light through a second mask.

11. The method of claim 6, wherein projecting the first illumination pattern comprises projecting light through a first mask at a first angle, and wherein projecting the second illumination pattern comprises projecting light through the first mask at a second angle different from the first angle.

12. A method comprising:
projecting a first illumination pattern on to a surface;
capturing, using a plurality of image sensors, a first set of images of the surface when the first illumination pattern is projected on to the surface;
ceasing to project the first illumination pattern on to the surface;
when the first illumination pattern is absent from the surface, projecting a second illumination pattern that differs from the first illumination pattern on to the surface;
capturing, using the plurality of image sensors, a second set of images of the surface when the second illumination pattern is projected on to the surface;
ceasing to project the second illumination pattern on to the surface, wherein the first illumination pattern is projected on to the surface when the second illumination pattern is absent from the surface; and
generating:
a three-dimensional (3D) image by performing a stereoscopic combination using the first set of images; and
a two-dimensional (2D) image using the second set of images,
wherein the method is repeatedly performed to generate a 2D image stream and a 3D image stream.

13. The method of claim 12, wherein the first and second illumination patterns are non-overlapping.

14. The method of claim 12, wherein projecting the first illumination pattern comprises projecting light through a first mask, and wherein projecting the second illumination pattern comprises projecting light through a second mask.

15. The method of claim 12, wherein projecting the first illumination pattern comprises projecting light through a first mask at a first angle, and wherein projecting the second illumination pattern comprises projecting light through the first mask at a second angle different from the first angle.

16. The method of claim 12, wherein generating the 2D image comprises:
identifying pixels in a first image from the first set of images that represent the first illumination pattern;
identifying pixels in a second image from the second set of images that correspond in surface location to the pixels identified in the first image, wherein the second illumination pattern is absent from the pixels identified in the second image; and filtering from the first image the first illumination pattern represented by the pixels identified in the first image using the pixels identified in the second image.

17. The method of claim 12, wherein an integration time for each image of the 2D image stream is longer than an integration time for each image of the 3D image stream.

18. The method of claim 17, wherein a rate at which the second set of images is captured is higher than a rate at which the first set of images is captured.

19. The method of claim 12, further comprising:
determining an amount of motion in at least one of the 2D and 3D image streams; and
when the amount of motion equals or exceeds a framerate increase threshold, increasing a rate at which at least one of the first and second sets of images is captured.

20. The method of claim 12, further comprising:
determining whether at least one of the 2D and 3D image streams satisfies an illumination pattern change threshold; and
when the illumination pattern change threshold is satisfied, replacing the first illumination pattern with a second illumination pattern that differs from the first illumination pattern, wherein at least a subsequent one of the first set of images comprises the second illumination pattern.

21. The method of claim 20, wherein determining when the illumination pattern change threshold is satisfied comprises:
determining an amount of motion in at least one of the 2D and 3D image streams; and
determining that the illumination pattern threshold is satisfied when the amount of motion in the at least one of the 2D and 3D image streams equals or exceeds the illumination pattern change threshold.

22. The method of claim 20, wherein determining when the illumination pattern change threshold is satisfied comprises:
determining an amount of depth information present in the 3D image stream; and
determining that the illumination pattern change threshold is satisfied when the amount of depth information equals or exceeds the illumination pattern change threshold.

23. The method of claim 20, wherein each of the first and second illumination patterns comprises a field of dots, and wherein the field of dots comprising the second illumination pattern has a higher density than the field of dots comprising the first illumination pattern.

24. A method comprising:
projecting a first structured light illumination pattern on to a surface;
capturing, using an image sensor, a first image of the surface when the first structured light illumination pattern is projected on to the surface;
ceasing to project the first structured light illumination pattern on to the surface;
when the first structured light illumination pattern is absent from the surface, projecting a second illumination pattern that differs from the first structured light illumination pattern on to the surface;
capturing, using the image sensor, a second image of the surface when the second illumination pattern is projected on to the surface;
ceasing to project the second illumination pattern on to the surface, wherein the first structured light illumination pattern is projected on to the surface when the second illumination pattern is absent from the surface; and
generating:
a three-dimensional (3D) image using the first image; and
a two-dimensional (2D) image using the first and second images,
wherein the method is repeatedly performed to generate a 2D image stream and a 3D image stream, and a first set of images comprising the first image and a second set of images comprising the second image.

25. The method of claim 24, wherein the second illumination pattern comprises a structured light illumination pattern.

26. The method of claim 24, wherein the first structured light illumination pattern and the second illumination pattern are non-overlapping.

27. The method of claim 24, wherein projecting the first structured light illumination pattern comprises projecting light through a first mask, and wherein projecting the second illumination pattern comprises projecting light through a second mask.

28. The method of claim 24, wherein projecting the first structured light illumination pattern comprises projecting light through a first mask at a first angle, and wherein projecting the second illumination pattern comprises projecting light through the first mask at a second angle different from the first angle.

29. The method of claim 24, wherein generating the 2D image comprises:
identifying pixels in the first image from the first set of images that represent the first structured light illumination pattern;
identifying pixels in the second image from the second set of images that correspond in surface location to the pixels identified in the first image, wherein the second illumination pattern is absent from the pixels identified in the second image; and
filtering from the first image the first structured light illumination pattern represented by the pixels identified in the first image using the pixels identified in the second image.

30. The method of claim 24, wherein an integration time for each image of the 2D image stream is longer than an integration time for each image of the 3D image stream.

31. The method of claim 30, wherein a rate at which the second set of images is captured is higher than a rate at which the first set of images is captured.

32. The method of claim 24, further comprising:
determining an amount of motion in at least one of the 2D and 3D image streams; and
when the amount of motion equals or exceeds a framerate increase threshold, increasing a rate at which at least one of the first and second sets of images is captured.

33. The method of claim 24, further comprising:
determining whether at least one of the 2D and 3D image streams satisfies an illumination pattern change threshold; and
when the illumination pattern change threshold is satisfied, replacing the first structured light illumination pattern with a second structured light illumination pattern that differs from the first structured light illumination pattern, wherein at least a subsequent one of the first set of images comprises the second structured light illumination pattern.

34. The method of claim 33, wherein determining when the illumination pattern change threshold is satisfied comprises:
- determining an amount of motion in at least one of the 2D and 3D image streams; and
- determining that the illumination pattern threshold is satisfied when the amount of motion in the at least one of the 2D and 3D image streams equals or exceeds the illumination pattern change threshold.

35. The method of claim 33, wherein determining when the illumination pattern change threshold is satisfied comprises:
- determining an amount of depth information present in the 3D image stream; and
- determining that the illumination pattern change threshold is satisfied when the amount of depth information equals or exceeds the illumination pattern change threshold.

36. The method of claim 33, wherein each of the first and second illumination patterns comprises a field of dots, and wherein the field of dots comprising the second illumination pattern has a higher density than the field of dots comprising the first illumination pattern.

\* \* \* \* \*